United States Patent [19]
Kitajima et al.

[11] Patent Number: 5,515,196
[45] Date of Patent: May 7, 1996

[54] OPTICAL INTENSITY AND PHASE MODULATORS IN AN OPTICAL TRANSMITTER APPARATUS

[75] Inventors: Shigeki Kitajima; Hirohisa Sano; Katsuhiko Kuboki, all of Kokubunji; Shinya Sasaki, Kodaira, all of Japan

[73] Assignee: Hitachi, Ltd., Tokyo, Japan

[21] Appl. No.: 42,380

[22] Filed: Apr. 2, 1993

[30] Foreign Application Priority Data

Apr. 7, 1992 [JP] Japan .................................. 4-085306

[51] Int. Cl.$^6$ ................................................... H04B 10/04
[52] U.S. Cl. ........................ 359/180; 359/181; 359/183; 372/26; 372/29
[58] Field of Search ..................... 359/180, 181, 359/183, 187, 188, 154; 372/26, 29, 31

[56] References Cited

U.S. PATENT DOCUMENTS

| | | | |
|---|---|---|---|
| 3,875,400 | 4/1975 | Pao et al. | 359/154 |
| 4,754,452 | 6/1988 | Henry | 359/183 |
| 5,073,331 | 12/1991 | Shirasaki | 372/26 |
| 5,184,243 | 2/1993 | Henmi et al. | 359/181 |
| 5,301,058 | 4/1994 | Olshansky | 359/188 |

FOREIGN PATENT DOCUMENTS

| | | | | |
|---|---|---|---|---|
| 2-291518 | 12/1990 | Japan | ............ | G02F 1/035 |
| 4-14010 | 1/1992 | Japan | ............ | G02F 1/035 |
| 0539177 | 4/1993 | Japan | ............ | 359/183 |

| | | | | |
|---|---|---|---|---|
| WO91/06882 | 5/1991 | WIPO | ............ | G02B 6/26 |

OTHER PUBLICATIONS

"IEICE (The Institute of Electronics, Information and Communication Engineers), Technical Report OQE 91–114, OCS 91–49", p. 75.
Patent Abstracts of Japan, vol. 16, No. 167, 22 Apr. 1992 & JP-A-04 014 010 (Fujitsu) 20 Jan. 1992.
Patent Abstracts of Japan, vol. 13, No. 176, 25 Apr. 1989 & JP-A-01 005 127 (NEC).
Patent Abstracts of Japan, vol. 12, No. 216, 21 Jun. 1988 & JP-A-63 013 017 (NEC).
Patent Abstracts of Japan, vol. 15, No. 417, 23 Oct. 1991 & JP-A-03 171 940 (NEC).

*Primary Examiner*—Leo Boudreau
*Assistant Examiner*—Rafael Bacares
*Attorney, Agent, or Firm*—Kenyon & Kenyon

[57] ABSTRACT

An optical transmitter apparatus comprises a light source for optical signal transmission, an intensity modulator, a transmit signal generator and a signal generator. A transmit signal to be transmitted is supplied from the transmit signal generator to the intensity modulator, while a signal generated by the signal generator is supplied to the phase modulator. A light beam emitted from the light source passes through the intensity modulator and the phase modulator to be subsequently sent out as an optical signal for transmission with intensity thereof being modulated upon passing through the intensity modulator while spectrum thereof being spread by phase modulation which the optical signal undergoes upon passing through the phase modulator.

18 Claims, 30 Drawing Sheets

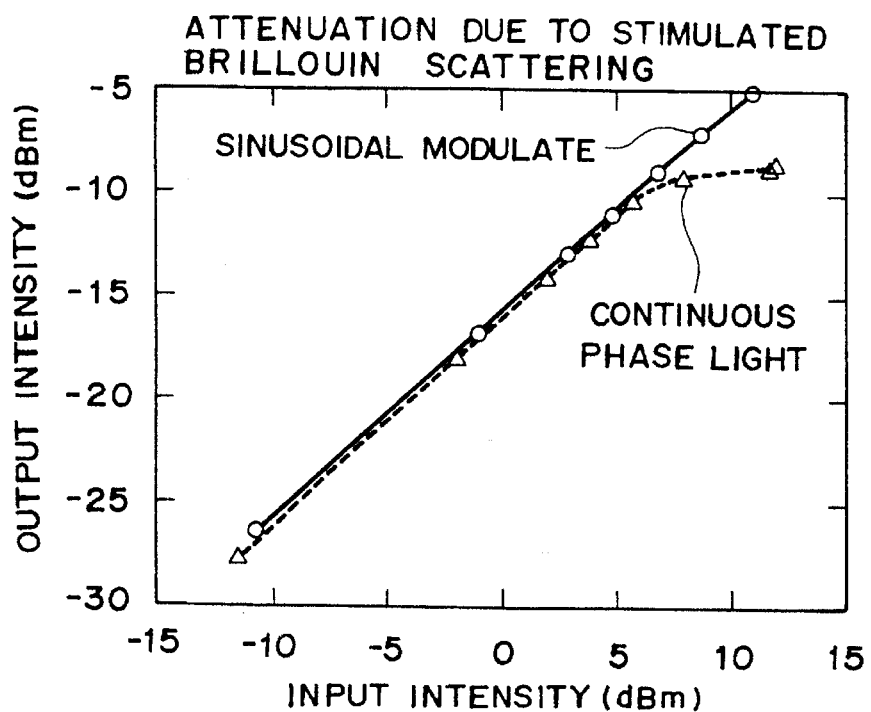
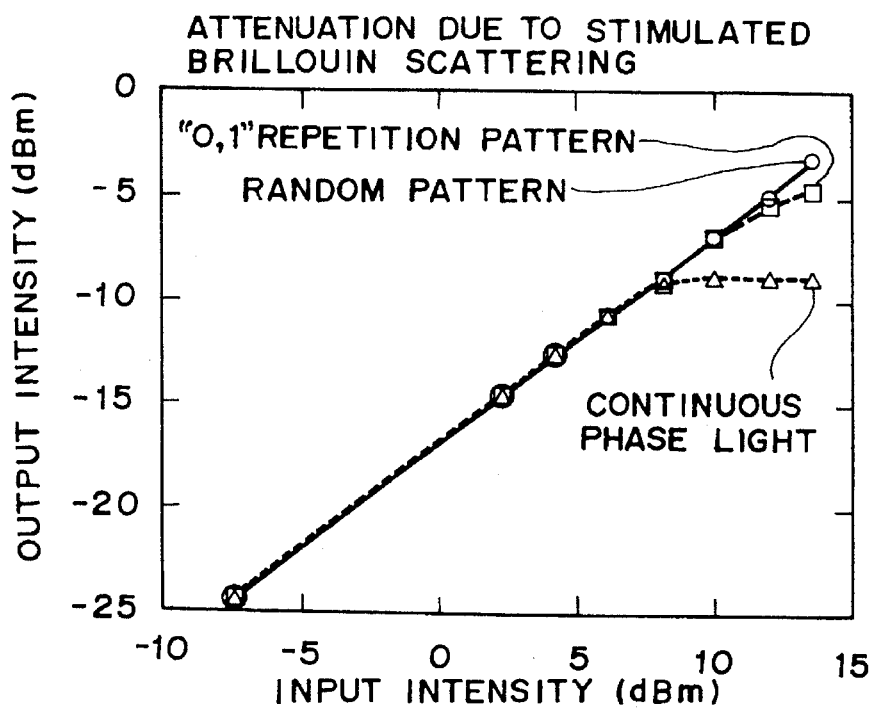

1. INPUT
2. OUTPUT 17-a
3. OUTPUT 17-b

1. INPUT
2. OUTPUT 17-a
3. OUTPUT 17-b a — a a - a b - b

PHASE MODULATOR | INTENSITY MODULATOR

ELECTRODE
OPTICAL WAVEGUIDE
LiNbO3 SUBSTRATE a−a

OPTICAL INTENSITY AND PHASE MODULATORS IN AN OPTICAL TRANSMITTER APPARATUS

BACKGROUND OF THE INVENTION

The present invention relates generally to an optical signal transmission using an optical fiber and more particularly to an optical transmitter as well as an optical signal transmission system which are suited advantageously for digital optical communication.

Progress in the optical communication technology in recent years is promising realization of a high-speed long-haul signal transmission. However, when an optical signal of high intensity is transmitted over a long distance through an optical fiber which scarcely attenuates the signal, there arise undesirable phenomena such as distortion of signal waveform, rapid or abrupt attenuation of the signal and the like due to waveform dispersion, non-linear optical effects and other causes, which phenomena can no more be neglected.

In order to protect the waveform against degradation or deterioration due to the waveform dispersion, it is necessary to suppress spectrum spreading (i.e., so-called chirping) of the optical signal in the optical transmitter. In this conjunction, an external modulation system (i.e., a system for modulating a light beam of a constant intensity or power emitted from a laser with an optical intensity modulator) is now replacing a hitherto known direct modulation system (i.e., a system for modulating the intensity of light beam by modulating a current for driving the laser). This is primarily for the reason that the external modulation system is less susceptible to the chirping. However, even when the external modulation system is adopted, there takes place equivalently a chirping due to phase modulation or shift which occurs in accompanying the intensity modulation. Under the circumstances, approaches or measures for lowering the phase modulation efficiency relative to the intensity modulation efficiency are now energetically studied.

On the other hand, stimulated Brillouin scattering which is one of the non-linear optical effects is more likely to take place as spectrum spreading of the light source becomes smaller. In reality, when an optical signal of high intensity is inputted to an optical fiber for long-haul transmission, the stimulated Brillouin scattering takes place, incurring rapid attenuation of the light signal propagating or travelling through the optical fiber. At this juncture, it is noted that the measures for coping with the stimulated Brillouin scattering due to the spectrum spreading is naturally in conflict with the measures for reducing the chirping of the light source. Accordingly, there exists a great demand for a method or technology which can solve both the problems mentioned above simultaneously in a satisfactory manner.

An approach for dealing with the problem of stimulated Brillouin scattering in the optical communication is discussed in "IEICE (The Institute of Electronics, Information and Communication Engineers) Technical Report OQE 91-114, OCS 91-49", p. 75. FIG. 2 shows a structure of an optical transmitter implemented on the basis of the technology disclosed in the above-mentioned literature. Referring to the figure, a light beam emitted from a light source 1 for signal transmission undergoes intensity modulation in an intensity modulator 2 in accordance with a signal to be transmitted (hereinafter referred to also as the transmit signal or transmission signal) generated by a transmit signal generator 4 before being transmitted through an optical fiber. As the measure for suppressing the stimulated Brillouin scattering, direct frequency modulation is effected for the light source 1 with a signal generated by a signal generator 5 for thereby spreading the spectrum of the light beam emitted from the light source 1.

The optical signal having spread spectrum suffers from jitter under the influence of dispersion which the optical signal undergoes in the course of propagation through the optical fiber. According to the teaching disclosed in the aforementioned literature, the time jitter can be estimated smaller than 14 ps when the modulating frequency is set higher than 10 kHz with frequency deviation being within 1 GHz for a transmission fiber exhibiting a total dispersion of 1800 ps/nm.

The prior art technique described above suffers from problems that a driver circuit of complicated configuration is required for the direct frequency modulation of the light source in order to spread the spectrum of the light beam for signal transmission and that variation in the light intensity can not be avoided.

Further, in the literature mentioned above, no discussion is made concerning the method of compensating for the phase-shifted components as a method of solving the problem of chirping brought about by the intensity modulator.

SUMMARY OF THE INVENTION

In the light of the state of the art, it is a first object of the present invention to protect the optical signal for transmission against adverse influence of the stimulated Brillouin scattering while suppressing to a possible minimum the variations in the intensity which take place in accompanying the spectrum spreading.

A second object of the present invention is to protect a signal waveform from degradation or deterioration due to the influence of dispersion within a transmission fiber by compensating for the phase-shifted components of the optical signal, which are generated in the intensity modulator.

Another object of the present invention is to simplify a structure which will otherwise become complicated by adding new elements and suppress a number of parts required for coupling the optical signals inclusive of a light source beam to a possible minimum.

For achieving the first mentioned object, there is provided according to an aspect of the present invention an optical transmitter apparatus which is comprised of a light source for signal transmission, an intensity modulator for modulating intensity of a light beam emitted by the light source with a transmit signal to be transmitted, and a phase modulator for spreading the spectrum of the optical signal or the light beam.

The second object of the invention can be achieved by providing an optical transmitter apparatus which includes a light source for emanating a light beam for signal transmission, an intensity modulator for modulating intensity of the light beam in accordance with a transmit signal, and a phase modulator which operates in linkage with the intensity modulator for compensating the chirping.

The third mentioned object of the invention can be achieved by providing an optical transmitter apparatus which includes a light source for emanating a light beam for signal transmission, an intensity modulator and a phase modulator for compensating the chirping or spreading the spectrum, wherein all or some of the three optical elements, i.e., the light source, the intensity modulator and the phase modulator, are implemented integrally with one another.

A light beam emitted from the light source undergoes intensity modulation by the intensity modulator and phase modulation by the phase modulator, whereby spectrum of the optical signal is spread, which is effective for suppressing the stimulated Brillouin scattering while avoiding variation in the intensity due to the spectrum spreading.

The phase modulator operating in linkage with the intensity modulator may be constituted by a phase modulator designed for compensating chirping, which serves for compensating or canceling out the phase-shifted components (chirping) which make appearance in accompanying the intensity modulation performed by the intensity modulator, whereby signal waveform can be protected against deterioration brought about under the influence of dispersion to which the signal is subjected to in the course of traveling through an optical fiber.

By implementing all or some of the three optical elements, i.e., the light source, the intensity modulator and the phase modulator, optical coupler elements which will otherwise be required for coupling these optical elements can be spared, which in turn means that the optical transmitter apparatus can be realized in a simplified structure of a reduced size.

The above and other objects, features and attendant advantages of the present invention will become more apparent by reading the following description of preferred embodiments taken in conjunction with the drawings.

BRIEF DESCRIPTION OF THE DRAWINGS

FIGS. 3A and 3B are charts for graphically illustrate results of an experiment performed for confirming effects obtained in the optical transmitter according to the first embodiment of the invention;

DESCRIPTION OF THE PREFERRED EMBODIMENTS

Now, the present invention will be described in detail in conjunction with preferred or exemplary embodiments thereof by reference to the drawings.

Figure 1:
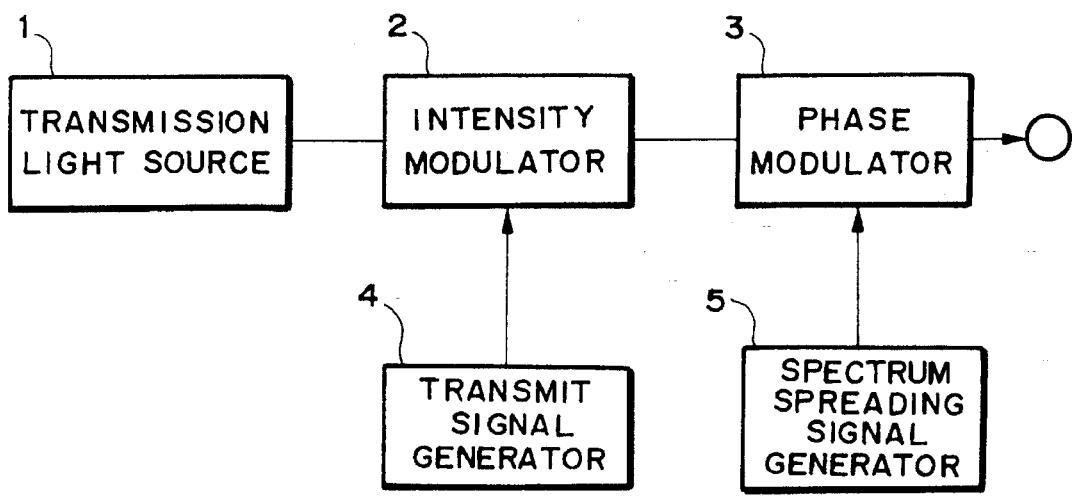
FIG. 1 is a block diagram showing schematically a general configuration of an optical transmitter apparatus according to a first embodiment of the present invention.

FIG. 1 shows schematically a general configuration of an optical transmitter apparatus according to a first embodiment of the present invention. Referring to the figure, a light beam for optical signal transmission is emanated from a light source 1 for signal transmission and caused to pass through an intensity modulator 2 and a phase modulator 3. A signal to be transmitted is generated by a transmit signal generator 4 and inputted to the intensity modulator 3, while a spectrum spreading signal generated by a spectrum spreading signal generator 5 is inputted to the phase modulator 3. Thus, the light beam emitted from the light source 1 undergoes intensity modulation in the intensity modulator 2 in accordance with the signal supplied from the transmit signal generator 4, whereby an intensity modulated optical signal is generated as the optical signal to be transmitted through an optical fiber. Further, the optical signal outputted from the intensity modulator 3 undergoes a phase modulation upon passing through the phase modulator 3 in accordance with the spectrum spreading signal generated by the spectrum spreading signal generator 5, whereby spectrum of the optical signal is spread. In this way, the optical signal outputted from the optical transmitter apparatus shown in FIG. 1 is protected against the stimulated Brillouin scattering.

FIGS. 3A and 3B graphically illustrate results of an experiment performed for confirming the effects obtained according to the instant embodiment of the invention for an optical signal transmitted through a single mode dispersion shifted fiber having a length of 60 km. In FIGS. 3A and 3B, input intensity of the optical signal inputted to the optical fiber is taken along the abscissa, while the output intensity of the optical signal upon leaving the fiber is taken along the ordinate. More specifically, FIG. 3A shows the result of the experiment in which a sinusoidal signal was employed as the spectrum spreading signal, and FIG. 3B shows the results obtained by employing a rectangular signal as the spectrum spreading signal. For the purpose of comparison or control, measurement was also performed by using a continuous phase optical signal as the spectrum spreading signal. It has been found that in the case of the continuous phase optical signal, the output intensity becomes constant for the input intensity which exceeds +9 dB, showing that influence of the stimulated Brillouin scattering makes appearance. On the other hand, for the optical signal which was subjected to the phase modulation with the sinusoidal signal (FIG. 3A) and the rectangular signal (FIG. 3B), influence of the stimulated Brillouin scattering is suppressed satisfactorily, as can be seen in FIGS. 3A and 3B. In particular, it has been found that the phase modulation with a rectangular signal of a random pattern is more effective for spectrum spreading and hence for suppressing the influence of the stimulated Brillouin scattering when compared with the phase modulation by using a rectangular signal of a regular pattern typified by a "1, 0"-repetition pattern. In any case, the results of the experiments shows that the spreading of spectrum by modulating the phase of the optical signal is effective for suppressing the stimulated Brillouin scattering.

At this juncture, it should however be mentioned that the waveform of the spectrum spreading signal is neither limited to the sinusoidal waveform nor the rectangular waveform. Any other suitable waveforms can be employed to this end.

Further, it should also be noted that in the optical transmitter apparatus according to the instant embodiment of the invention, the order in which the light beam or the optical signal is inputted to the intensity modulator 2 and the phase modulator 3 presents practically no problem. In other words, the aimed effect can equally be obtained even when the signal input sequence is changed such that the light beam emitted by the light source 1 is first inputted to the phase modulator 3 and then the output optical signal of the latter is inputted to the intensity modulator 2.

As typical elements which can be employed as the phase modulator 3, there may be mentioned those made of a semiconductor material such as gallium arsenide or lithium niobate ($LiNbO_3$), by way of example. As the intensity modulator 2, there may be employed an electro-absorption type intensity modulator or a Mach-Zehnder type intensity modulator which can be implemented by a combination of two phase modulators.

Since both the intensity modulator 2 and the phase modulator 3 can be realized by using a same material, both modulators can easily be implemented in an integrated structure. An embodiment of the invention in which an optical element realized by integrating the intensity modulator and the phase modulator with each other is employed will be described below.

Figure 4:
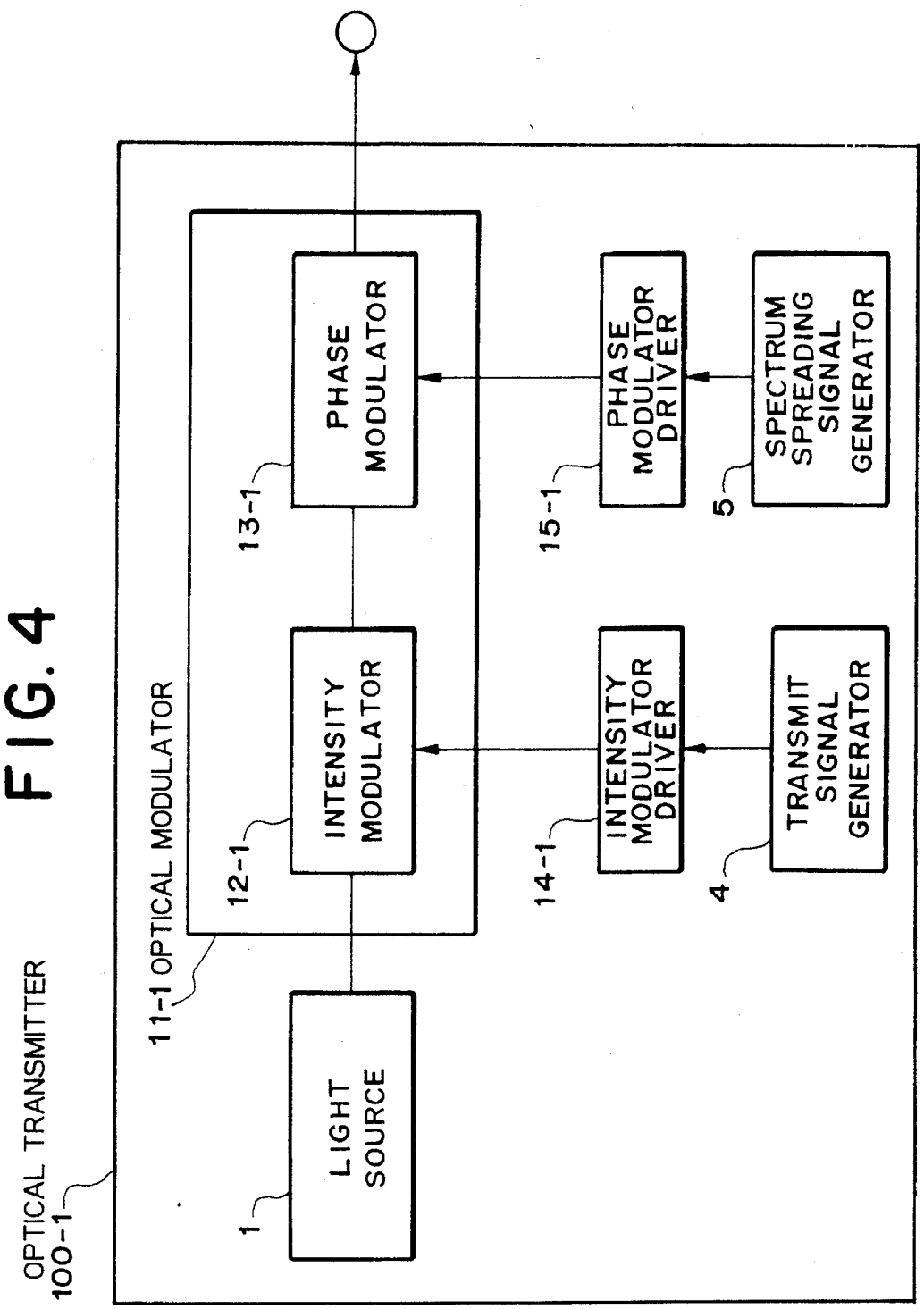
FIG. 4 is a block diagram showing a configuration of an optical transmitter apparatus according to a second embodiment of the invention.

FIG. 4 shows a configuration of an optical transmitter apparatus 100-1 according to a second embodiment of the invention in which an electro-absorption type intensity modulator is integrally combined with a semiconductor phase modulator. Referring to the figure, a light beam emitted from a light source 1 for signal transmission is inputted to an optical modulator 11-1. A signal for transmission which is generated by a transmit signal generator 4 is inputted to an intensity modulator driver circuit 14-1, whose output signal is applied to an intensity modulator element 12-1 incorporated in the optical modulator 11-1. The output signal of the intensity modulator driver circuit 14-1 is an electric signal having a predetermined voltage or current level which is sufficiently high for modulating the intensity of the light beam inputted to the optical modulator 11-1. A reference numeral 5 denotes a spectrum spreading signal generator, whose output signal is inputted to a phase modulator driver circuit 15-1, the output signal of which in turn is applied to a phase modulator element 13-1 incorporated in the optical modulator 11-1 for modulating phase of the optical signal outputted from the intensity modulator element 12-1. The output signal of the phase modulator driver circuit 15-1 is an electric signal having a predetermined voltage or current level which is sufficiently high to spread the spectrum of the optical signal outputted from the intensity modulator element 12-1. Thus, the light beam inputted to the optical modulator 11-1 undergoes an intensity modulation by the intensity modulator element 12-1 and then a spectrum spreading operation of the phase modulator element 13-1 to be finally sent out from the optical transmitter apparatus 100-1. Because the optical signal as sent out has a spectrum spread, the stimulated Brillouin scattering can effectively be suppressed.

The optical modulator 11-1 can easily be implemented in an integral structure by manufacturing the intensity modulator element 12-1 and the phase modulator element 13-1 from semiconductor materials belonging to a same series. By integrating both the elements in this way, loss of light at the coupling interface between the intensity modulator element 12-1 and the phase modulator element 13-1 can satisfactorily be prevented. Besides, there can be spared any optical coupler which will otherwise be required for optically coupling the elements 12-1 and 13-1.

In the case of-the instant embodiment, the order in which the light beam and the optical signal are inputted to the intensity modulator element 12-1 and the phase modulator element 13-1 may be reversed relative to the order shown in FIG. 4, to essentially same effects.

Figure 5:
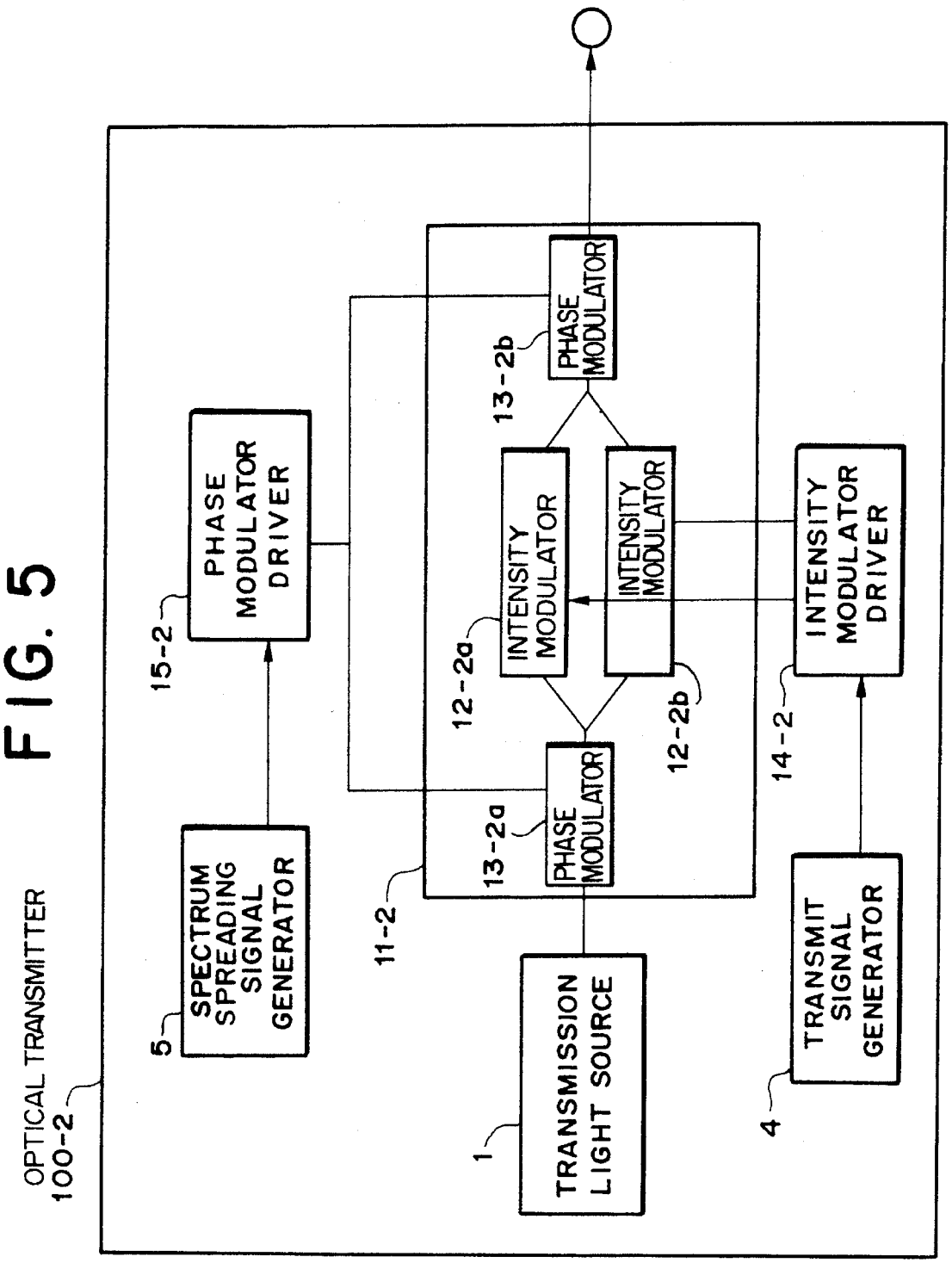
FIG. 5 is a block diagram showing an optical transmitter apparatus according to a third embodiment of the present invention.

FIG. 5 shows an optical transmitter apparatus according to a third embodiment of the present invention in which a Mach-Zehnder type intensity modulator constituted by a combination of two phase modulators is combined with a phase modulator in an integral structure. Referring to the figure, a light beam emitted from a light source 1 is inputted to an optical modulator 11-2. A signal for transmission is generated by a transmit signal generator 4 and inputted to an intensity modulator driver circuit 14-2 which produces two output signals. These output signals are then inputted to intensity modulator elements 12-2a and 12-2b, respectively, which are incorporated in the optical intensity modulator 11-2. Each of the outputs of the intensity modulator driver circuit 14-2 is an electric signal having a predetermined voltage or current level which renders the optical phase difference between the optical signals passing through the intensity modulator elements 12-2a and 12-2b, respectively, to be zero or 180 degrees. In this conjunction, it should be mentioned that the optical output of the Mach-Zehnder type intensity modulator assumes a maximum level, when the phase difference between the optical signals passing through the optical modulating elements 12-2a and 12-2b, respectively, is zero degree while assuming a minimum value due to interference when the above-mentioned phase difference is 180 degree. A spectrum spreading signal generated by a spectrum spreading signal generator 5 is inputted to a phase modulator driver circuit 15-2, whose output signal is supplied to phase modulator elements 13-2a and 13-2b, respectively, which are equally incorporated in the optical modulator 11-2. The output of the phase modulator driver circuit 15-2 is also an electric signal having a predetermined voltage or current level capable of modulating the phase of the light beam and the optical signal passing through the phase modulator elements 13-2a and 13-2b, respectively. The light beam inputted to the optical modulator 11-2 is modulated in respect to the intensity by the intensity modulator elements 12-2a and 12-2b, while being spread in spectrum by the phase modulator elements 13-2a and 13-2b, to be finally sent out from the optical transmitter 100-2. The optical signal as sent out is scarcely affected by the stimulated Brillouin scattering because of the spectrum being spread.

The optical modulator 11-2 can easily be realized in an integral structure by manufacturing the intensity modulator elements 12-2a, 12-2b and the phase modulator elements 13-2a, 13-2b from semiconductor materials of a same series such as lithium niobate. Owing to the integration, optical loss at the coupling interfaces between the intensity modulator elements 12-2a, 12-2b and the phase modulator elements 13-2a, 13-2b can be reduced. Besides, optical coupling elements which will otherwise be required can be spared.

In the case of the optical transmitter apparatus according to the third embodiment of the invention described above by reference to FIG. 5, the phase modulator is separated into two phase modulator elements 13-2a and 13-2b. In general, however, essentially same effects can be attained with a modulator configuration in which the intensity modulator elements 12-2a and 12-2b are combined with either one of the phase modulator element 13-2a of the preceding stage or the phase modulator element 13-2b of the succeeding stage.

Figure 6:
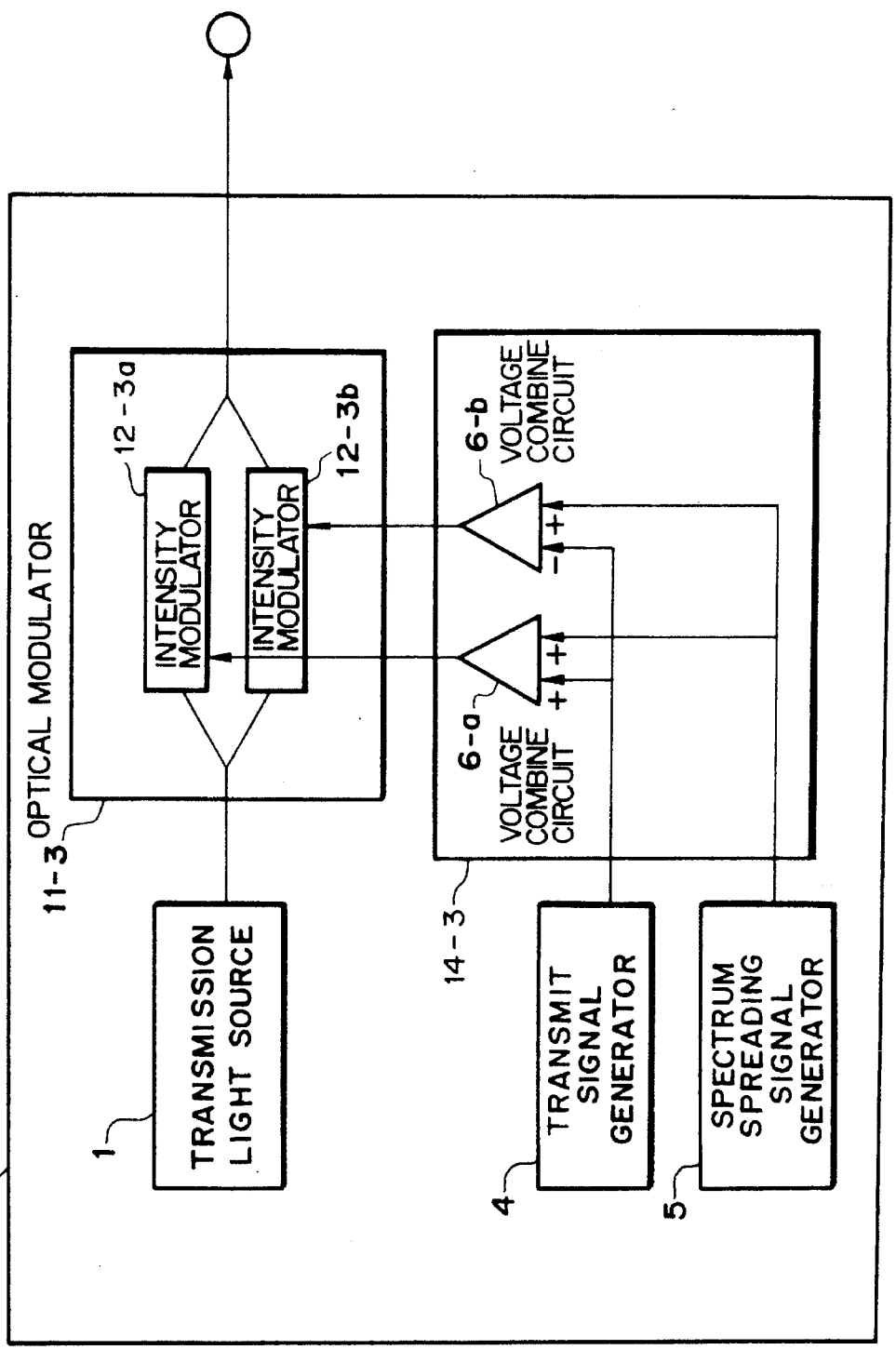
FIG. 6 is a block diagram showing an optical transmitter apparatus according to a fourth embodiment of the invention.

FIG. 6 shows an optical transmitter apparatus according to a fourth embodiment of the present invention in which a Mach-Zehnder type intensity modulator constituted by a combination of two phase modulators is designed to serve also for the function of a phase modulator. Referring to the figure, a light beam emitted from a light source 1 is inputted to an optical modulator 11-3. A signal to be transmitted as generated by a transmit signal generator 4 and a signal generated by a spectrum spreading signal generator 5 are inputted to an intensity modulator driver circuit 14-3, in which both input signals are combined by voltage combine circuits 6-a and 6-b, the outputs of which are then applied to intensity modulator elements 12-3a and 12-3b, respectively.

The signal for transmission as generated by the transmit signal generator 4 is applied to the input of the voltage combine circuit 6-a as a voltage signal of positive (plus) polarity, while being applied to the input of the voltage combine circuit 6-b as a voltage signal of negative (minus) polarity, to thereby render the optical phase difference of the optical signal between the intensity modulator elements 12-3a and 12-3b to be zero or 180 degrees. On the other had, the signal outputted from the spectrum spreading signal generator 5 is applied to the inputs of both voltage combine circuits 6-a and 6-b as a voltage signal of positive polarity to make effective an in-phase modulation in the intensity modulator elements 12-3a and 12-3b. As a result of this, the signal to be transmitted which is generated by the transmit signal generator 4 partakes in the intensity modulation of the optical signal for transmission, while the signal generated by the spectrum spreading signal generator 5 contributes to the phase modulation.

The light beam inputted to the optical modulator 11-3 is modulated in intensity and phase and spread in spectrum, to be finally sent out from the optical transmitter apparatus 100-3. The optical signal as sent out is effectively protected against influence of the stimulated Brillouin scattering.

Since the optical modulator 11-3 is constituted only by the intensity modulator elements 12-3a and 12-3b, the number of optical parts as required can be reduced, to another advantage.

Figure 7:
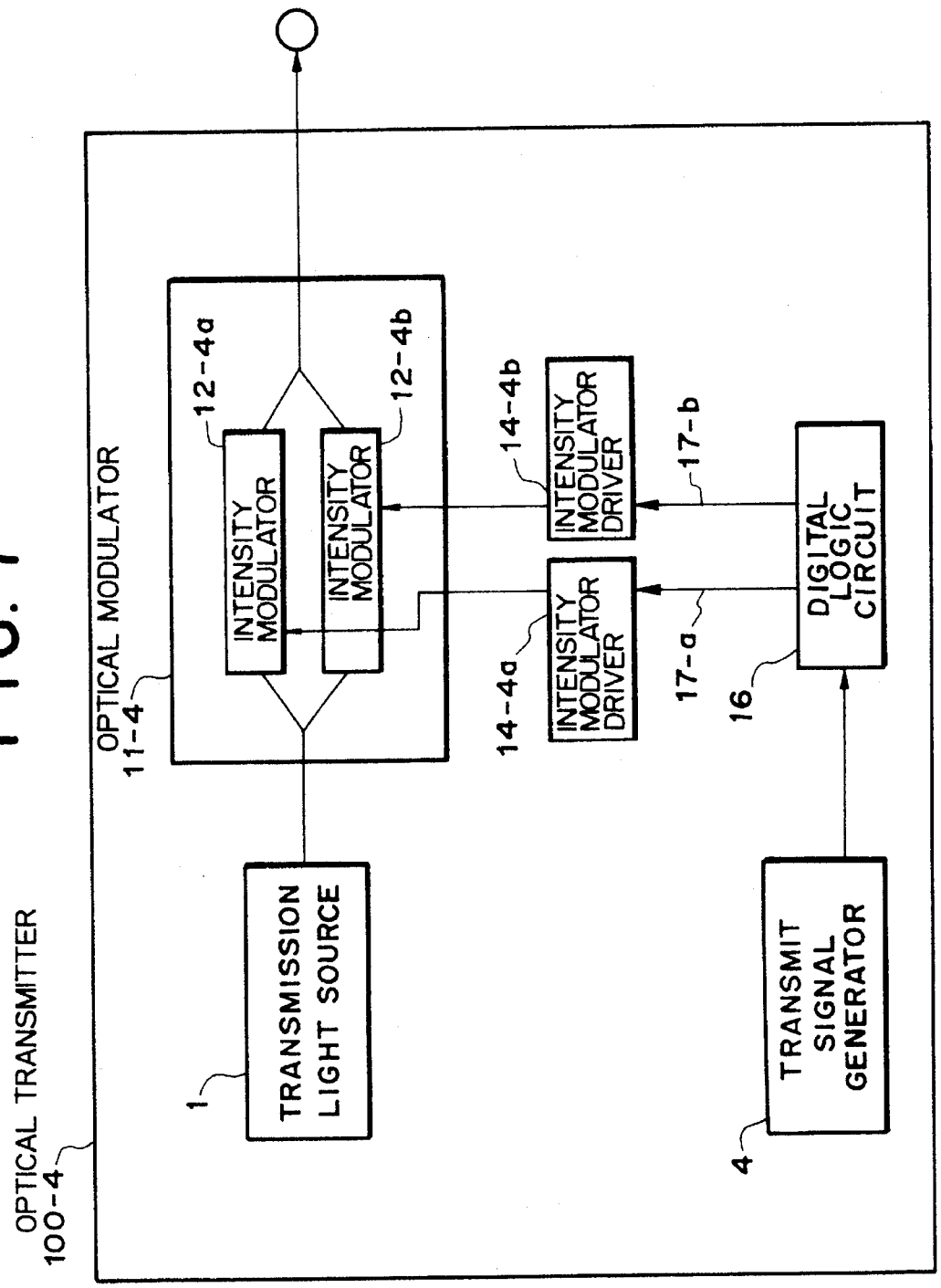
FIG. 7 is a block diagram showing a circuit configuration of an optical transmitter apparatus according to a fifth embodiment of the invention.

FIG. 7 shows a circuit configuration of an optical transmitter apparatus according to a fifth embodiment of the invention in which a Mach-Zehnder type intensity modulator constituted by a combination of two phase modulators is employed. Referring to the figure, a light beam emitted from a transmission light source 1 is inputted to an optical modulator 11-4. A transmit signal to be transmitted as generated by a transmit signal generator 4 is inputted to a digital logic circuit 16. Digital signals 17-*a* and 17-*b* outputted from the digital logic circuit 16 as a result of logical processing of the transmit signal are inputted to intensity modulator driver circuits 14-4*a* and 14-4*b*, respectively. The output signals of these two driver circuits 14-4*a* and 14-4*b* are inputted to intensity modulator elements 12-4*a* and 12-4*b*, respectively, which constitute the optical modulator 11-4. The optical signals inputted to the optical modulator 11-4 undergoes intensity modulation and phase modulation through the intensity modulator element 12-4*a* and 12-4*b*, respectively, to be sent out from the optical transmitter apparatus 100-4 with spread spectrum being spread.

The digital signals 17-*a* and 17-*b* which are delivered from the two outputs, respectively, of the digital logic circuit 16 assume values "0" and "1". When the digital signal 17-*a* is "0", the output of the intensity modulator driver circuit 14-4*a* assumes a level of "V–", whereby the phase of the light beam passing through the intensity modulator element 12-4*a* is caused to advance by 90° from a reference phase. On the other hand, when the digital signal 17-*a* is "1", the output of the intensity modulator driver circuit 14-4*a* assumes a level of "V+", whereby the phase of the light beam passing through the intensity modulator element 12-4*a* is delayed by 90° relative to the reference phase. Similarly, when the digital signal 17-*b* is "0" or "1", the output of the intensity modulator driver circuit 14-4*b* assumes the level of "V–" or "V+", as a result of which the phase of the light beam passing through the intensity modulator element 12-4*b* is caused to advance or delay by 90° relative to the reference phase.

In dependence on combinations of the digital signals 17-*a* and 17-*b*, intensity and phase of the optical signal outputted from the optical modulator 11-4 undergoes modulations, as mentioned below.

In general, operation or function of the digital logic circuit 16 is as follows. When the transmit signal supplied from the transmit signal generator 4 is "0", combination of the digital signals 17-*a* and 17-*b* generated by the digital logic circuit 16 is represented by "0, 1" or "1, 0". On the other hand, when the signal supplied from the transmit signal generator 4 is "1", the digital logic circuit 16 generates combinations of digital signals 17-*a* and 17-*b* in an alternating, random or predetermined sequence of "0, 0" and "1, 1".

Thus, the phase of the optical signal as outputted is correspondingly modulated with the spectrum thereof being spread, which is effective for suppressing the stimulated Brillouin scattering.

Since the optical modulator 11-4 is constituted only by the intensity modulator elements 12-4*a* and 12-4*b*, the number of components required for implementation of the optical signal transmitter apparatus according to the instant embodiment can be decreased, to further advantage.

Figure 8B:
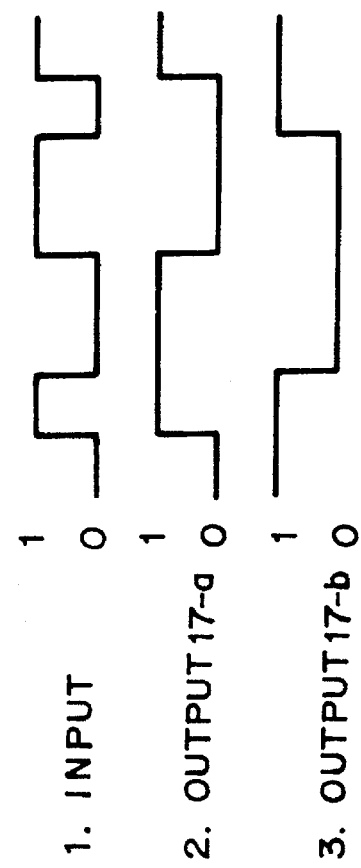
FIG. 8B is a waveform diagram for illustrating operation of the digital logic circuit shown in FIG. 8A.
Figure 8A:
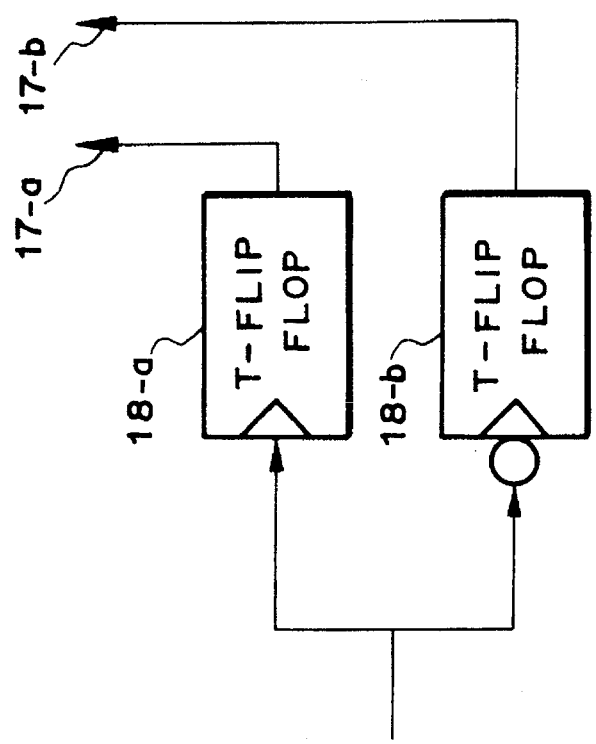
FIG. 8A is a block diagram showing an exemplary circuit configuration of a digital logic circuit.

FIG. 8A shows, by way of example, a circuit configuration of the digital logic circuit 16. As can be seen in the figure, the digital logic circuit 16 is comprised of two T flip-flops 18-*a* and 18-*b*, wherein the signal to be transmitted is inputted to each of these T flip-flops 18-*a* and 18-*b*, whereby corresponding output signals 17-*a* and 17-*b* are generated by these T flip-flops 18-*a* and 18-*b*, respectively. The input signal for transmission is a digital signal of NRZ code (non-return-to-zero code), as shown in FIG. 8B at a row 1. The T flip-flop 18-*a* is triggered in response to a rise-up edge of the input signal to thereby produce an output signal having a waveform such as illustrated in FIG. 8B at a row 2. On the other hand, the T flip-flop 18-*b* is triggered in response to a falling edge of the input signal to produce an output signal having such a waveform as shown in FIG. 8B at a row 3. With a simplified digital circuit configuration as described above, it is possible to suppress the stimulated Brillouin scattering.

Figure 9B:
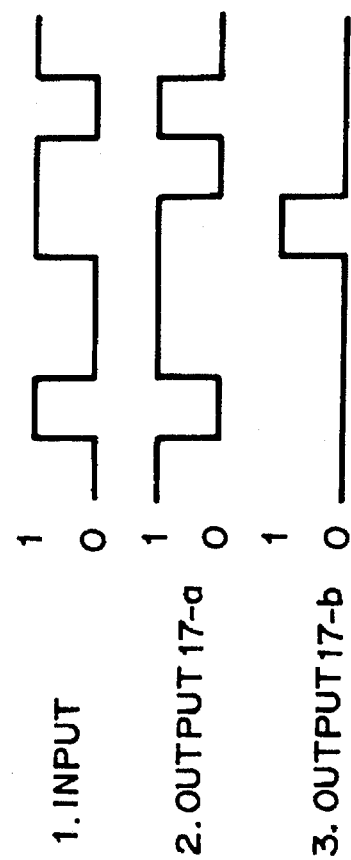
FIG. 9B is a waveform diagram for illustrating operation of the digital logic circuits shown in FIG. 9A.
Figure 9A:
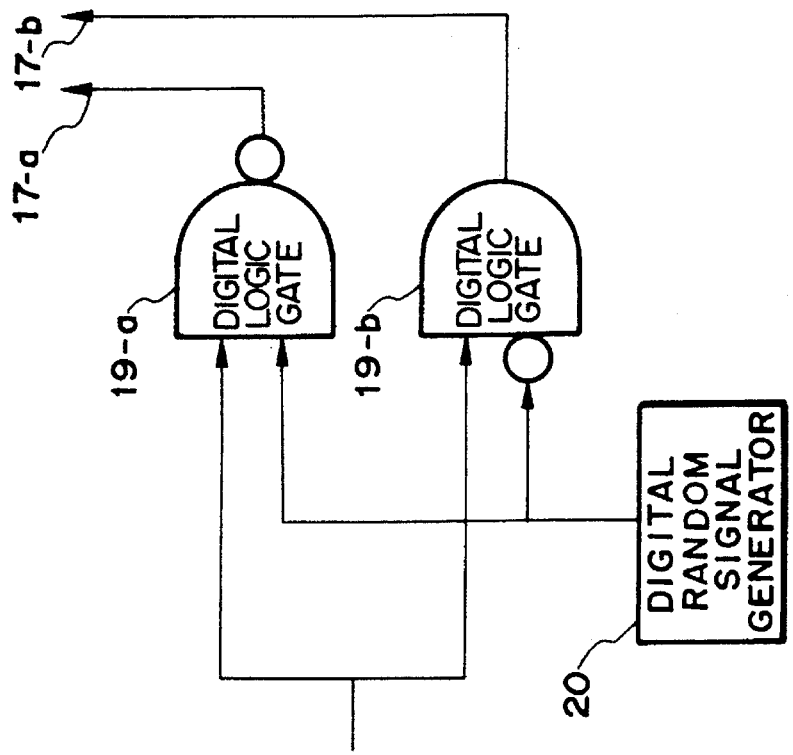
FIG. 9A is a block diagram showing another exemplary configuration of a digital logic circuit.

FIG. 9A shows another exemplary configuration of the digital logic circuit 16. Referring to the figure, a signal for transmission (i.e., transmit signal) is inputted to two logic gates 19-*a* and 19-*b*, whereby two output signals 17-*a* and 17-*b* are outputted from these logic gates 19-*a* and 19-*b*, respectively. FIG. 9B illustrates waveforms of the input signal and the output signals of the digital logic gates. In FIG. 9A, a reference numeral 20 denotes a digital random signal generator whose output signal is inputted to the aforementioned two digital logic gates 19-*a* and 19-*b*. With the configuration of the digital logic circuit 16 shown in FIG. 9A, the output signals 17-*a* and 17-*b* are combined such that these outputs assume a combination of "0, 0" when the input signal is "0", while assuming a combination of "0, 0" or "1, 1" in dependence on the signal outputted from the digital random signal generator 20.

The digital random signal generator 20 employed in this embodiment may be so designed as to generate "0" and "1" alternately with each other or generate "0" and "1" mixed in accordance with a predetermined rule. In any case, the stimulated Brillouin scattering can effectively be suppressed. At this juncture, it is noted that the timing at which the output signal of the digital random signal generator 20 should desirably coincide with the timing of the transmit signal. Accordingly, there is conceived such arrangement in which a clock signal employed for controlling the transmit signal generator or alternatively the transmit signal itself is employed as a trigger signal, although illustration of a concrete circuit configuration to this end is omitted.

In the optical signal transmitter apparatuses according to the fourth and fifth embodiments, respectively, a Mach-Zehnder type modulator is employed. The Mach-Zehnder type modulator however suffers from a problem that extinction ratio is degraded due to difference in the refractive index and the optical path length between the two intensity modulator elements constituting the Mach-Zehnder type modulator. However, the problem of degradation of the extinction ratio can be solved by compensating for the effective optical path length by applying a bias signal to the two outputs of the intensity modulator driver circuit 14-2 or 14-3.

Figure 10:
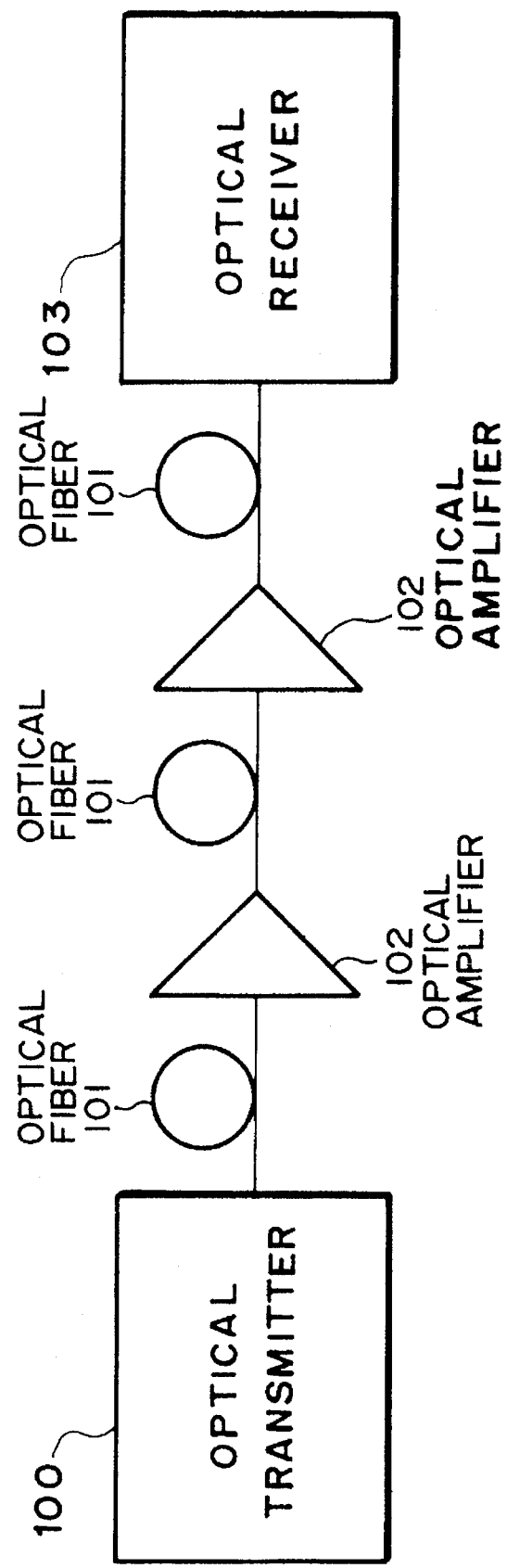
FIG. 10 is a schematic block diagram showing a structure of an optical signal transmission system in which one of the optical transmitter apparatuses according to the first to fifth embodiments is employed.

FIG. 10 shows schematically a structure of an optical signal transmission system in which one of the optical transmitter apparatuses according to the first to fifth embodiments of the invention is employed. Referring to the figure, the optical signal transmission system illustrated is comprised of one optical signal transmitter 100, at least one optical fiber 101 for signal transmission, optical amplifiers 102 and an optical signal receiver 103. Output signal of the optical transmitter 100 is inputted to the optical fiber 101. In case only a single optical fiber is employed for the signal transmission, the output signal from the optical fiber 101 is inputted straightforwardly to the optical receiver 103. In case a plurality of serial optical fibers 101 are employed, the output signal of one optical fiber is once amplified by the optical amplifier 102 and inputted to a succeeding optical fiber 101. The output of the last optical fiber is inputted to the optical receiver 103.

Since the optical signal outputted from the optical transmitter 100 is spread in spectrum, the former can be transmitted to the optical receiver 103 without undergoing adverse influence of the stimulated Brillouin scattering in the course of propagation through the optical fiber.

Figure 11:
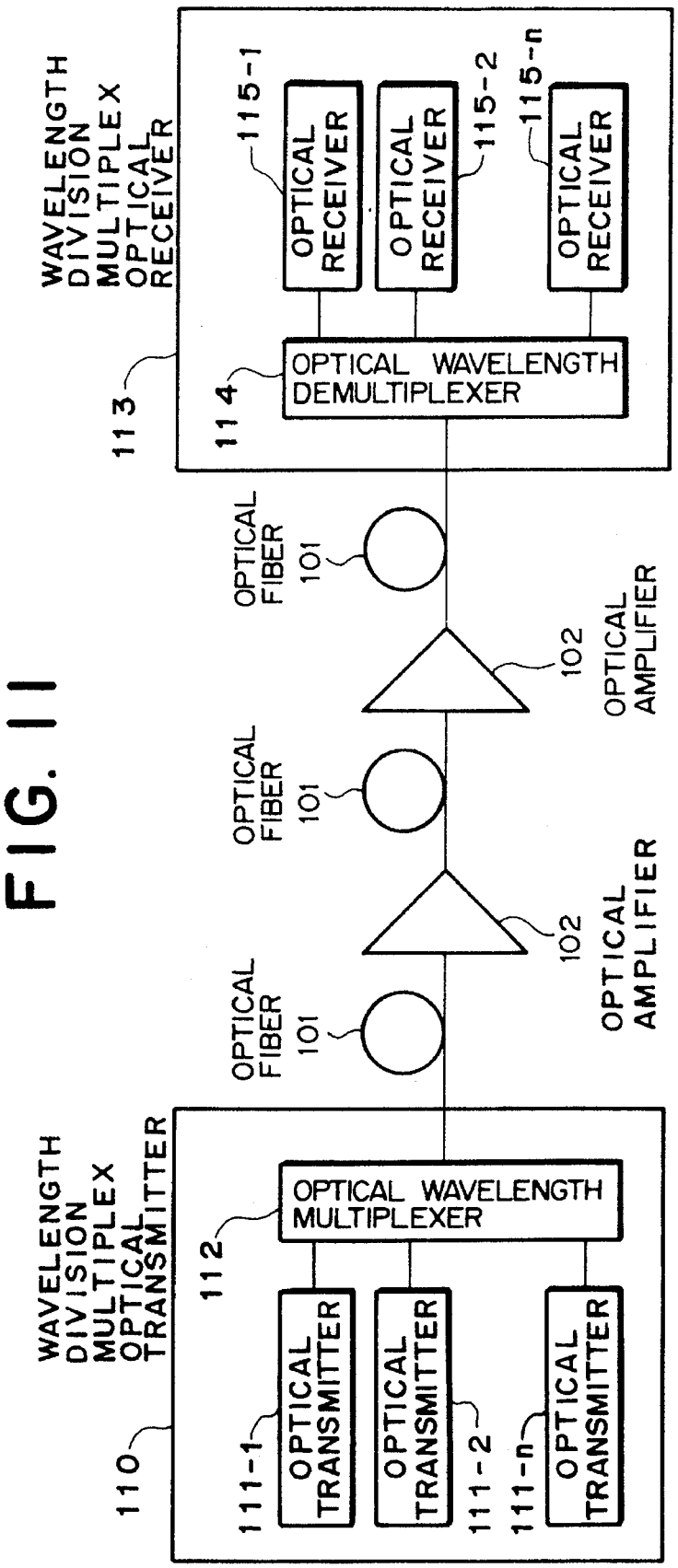
FIG. 11 is a block diagram showing schematically a structure of an optical signal transmission system according to a further embodiment of the invention in which one of the optical transmitter apparatuses according to the first to fifth embodiments may be employed.

FIG. 11 shows schematically a structure of an optical transmission system according to a further embodiment of the invention in which one of the optical transmitters described hereinbefore in conjunction with the first to fifth embodiments can be employed. Referring to the figure, the optical transmission system according to the instant embodiment is comprised of a wavelength division multiplex optical transmitter unit 110 which includes a plurality of optical transmitters 111-1 to 111-n (denoted generally by 111-(1~n)) and an optical wavelength multiplexer 112, at least one optical transmission fiber 110 and an optical amplifier(s) 102, and a wavelength division multiplex optical receiver apparatus 113 which includes an optical wavelength demultiplexer 114 and a plurality of optical receivers 115-5 to 115-n (denoted generally by 115-(1~n)).

The outputs of the individual optical transmitters 111-(1~n) are inputted to the optical wavelength multiplexer 112 to be multiplexed into an optical signal which is outputted from the wavelength division multiplex optical transmitter unit 110 as the output signal thereof, which is then inputted to the optical fiber 101. In the case where only one optical fiber 101 is provided for the transmission of the optical signal, the output signal leaving the serial optical fiber 101 is inputted straightforwardly to the wavelength division multiplex receiver apparatus 113. On the other hand, when a plurality of optical fibers 101 are provided, the output signal of the optical fiber 101 is first amplified by the optical amplifier 102 before being inputted to the wavelength division multiplex optical receiver apparatus 113. The optical signal inputted to the wavelength division multiplex optical receiver apparatus 113 is applied to the input of the optical wavelength demultiplexer 114, and a plurality of optical signal outputs resulting from the demultiplexing operation of the demultiplexer 114 are inputted to the optical receivers 115-(1~n), respectively, to be received thereby.

Since the optical signal outputted from the wavelength division multiplex transmitter unit 110 has spectrum spread by the optical transmitters 111-(1~n), the optical signal can reach the wavelength division multiplex receiver apparatus 113 without suffering the influence of the stimulated Brillouin scattering in the course of propagation through the optical fiber 101.

Figure 12:
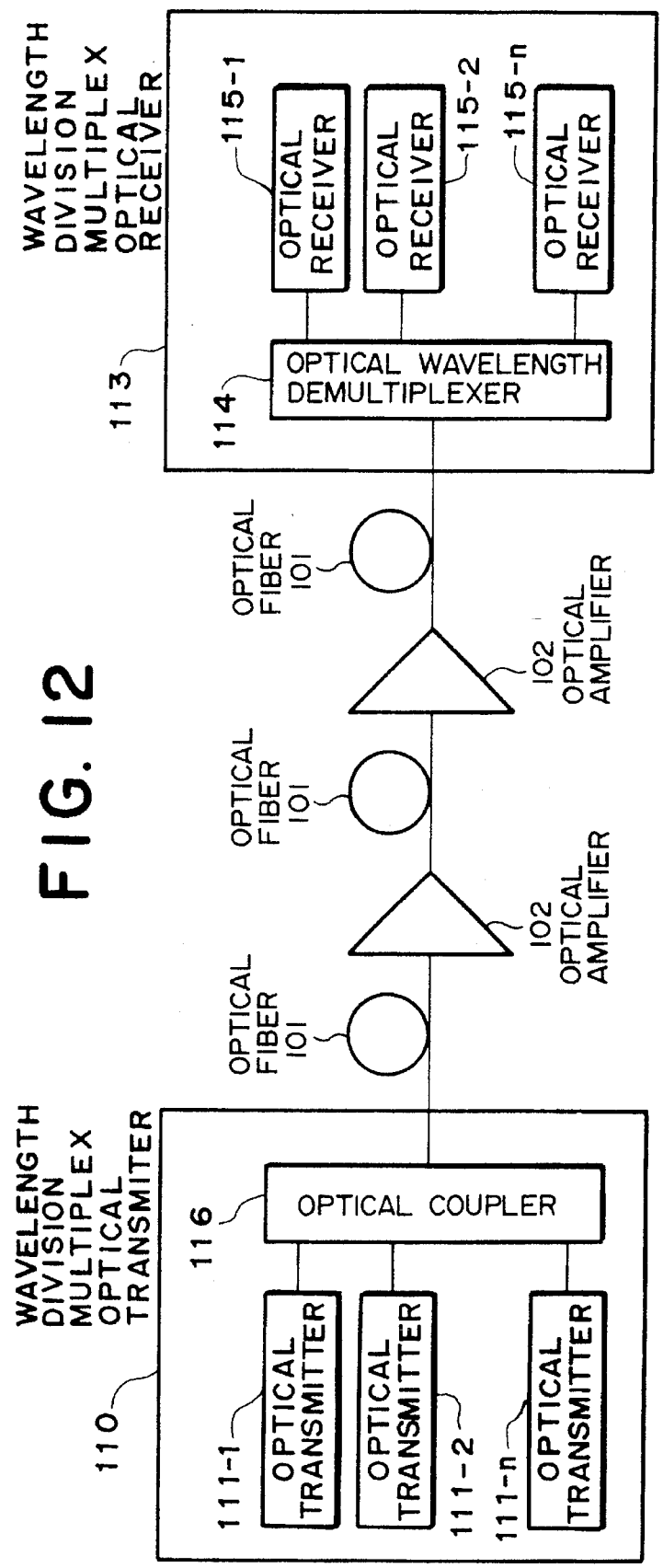
FIG. 12 is a block diagram showing a modification of the optical signal transmission system shown in FIG. 11.

As a modification of the instant embodiment, the optical wavelength multiplexer 112 may be replaced by an optical coupler, to substantially same advantageous effects. A structure of this modification is shown in FIG. 12, in which the optical coupler is denoted by a numeral 116.

As mentioned previously, it is known that the optical signal for transmission which is phase-modulated in the optical transmitter apparatus 100 described hereinbefore in conjunction with the first to fourth embodiments of the invention suffers time jitter upon reception under the influence of dispersion of wavelength during the transmission through the optical fiber. To cope with this problem, it is conceived to control the clock of the transmit signal generator 4 so that difference or deviation in the transmission delay time can be compensated for.

Figure 13:
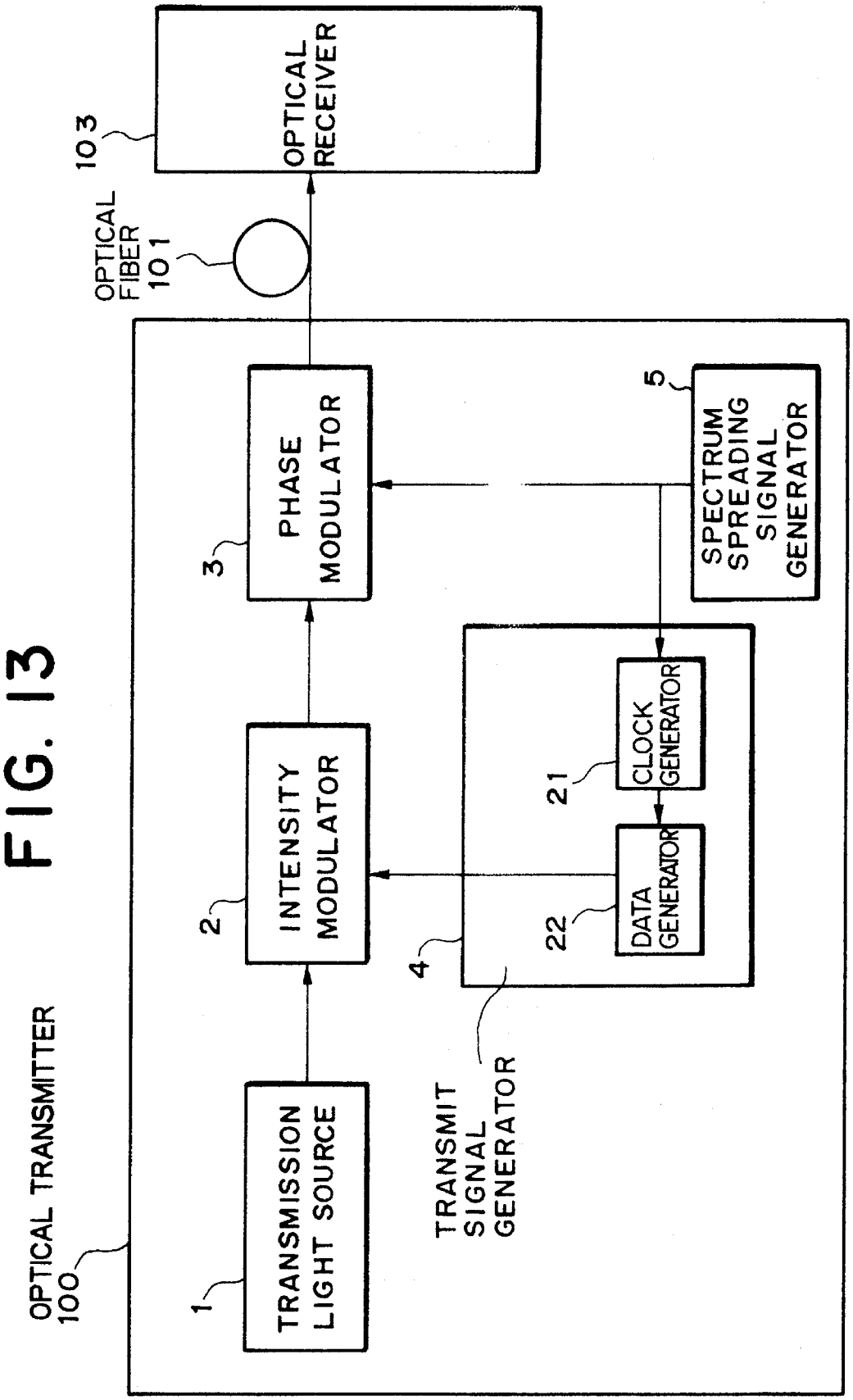
FIG. 13 is a block diagram showing schematically a further embodiment of the optical signal transmission system according to the invention in which a clock control is adopted.

FIG. 13 shows schematically a further embodiment of the invention according to which a clock control is adopted in the optical transmitter apparatus of the first embodiment. Referring to the figure, the output signal of the spectrum spreading signal generator 5 is inputted to a clock generator circuit 21 which constitutes a part of the transmit signal generator 4. The output of the clock generator circuit 21 is inputted to a data generator circuit 22. The optical signal phase-modulated in accordance with the output signal of the spectrum spreading signal generator 5 undergoes change in the transmission delay time under the influence of dispersion in the course of propagation through the optical fiber. Accordingly, adjustment of the clock output timing of the clock generator circuit 21 in accordance with the output signal of the spectrum spreading signal generator 5 allows the optical signal to arrive at the receiver apparatus 103 at a substantially constant timing even when the transmission delay time of the phase-modulated optical signal varies under the influence of the dispersion during the transmission. Thus, the reception sensitivity can be protected against deterioration due to the time jitter notwithstanding of the phase modulation of the optical signal.

Figure 2:
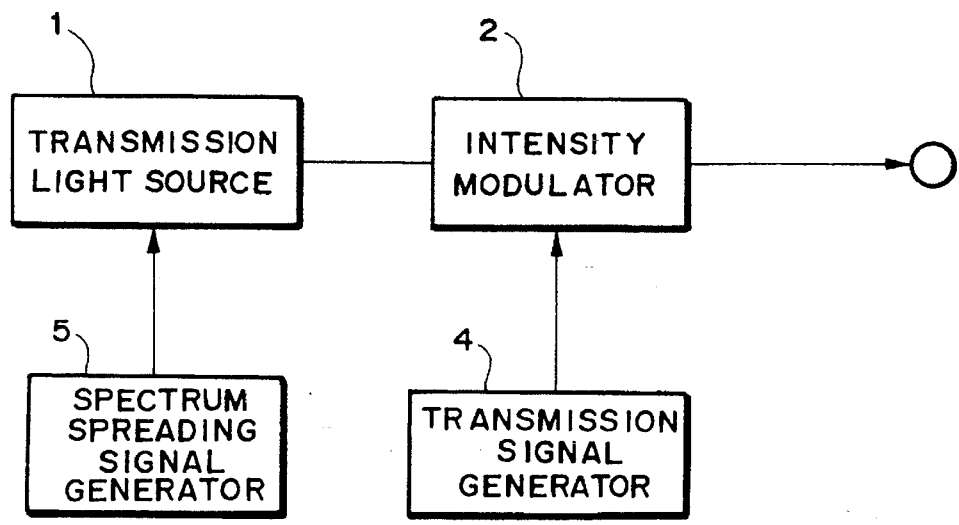
FIG. 2 is a block diagram showing a structure of an optical transmitter known heretofore.

The teaching of the invention described just above can be incarnated in the transmitter apparatus according to the second to fourth embodiments, to ensure similar advantageous effect. Further, it should be mentioned that the arrangement described above can provide similar effect even in the hitherto known system shown in FIG. 2 where a direct modulation of a laser frequency is adopted as a method of suppressing the stimulated Brillouin scattering.

Figure 14:
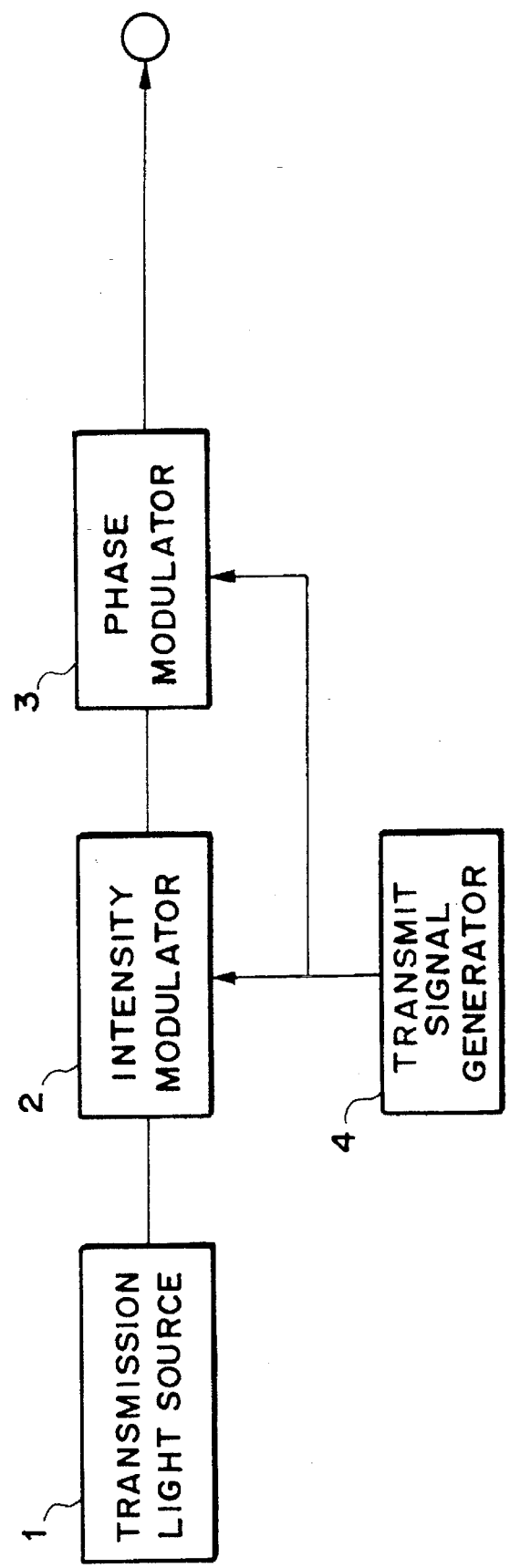
FIG. 14 is a schematic block diagram showing a basic structure of an optical transmitter apparatus according to a six embodiment of the invention.

FIG. 14 shows a basic structure of an optical transmitter apparatus according to a six embodiment of the invention which is designed to achieve the second object contemplated by the invention and mentioned hereinbefore.

Referring to FIG. 14, a light beam emitted from a light source 1 for signal transmission is caused to pass through an intensity modulator 2 and a phase modulator 3 before being outputted. An output signal of a transmit signal generator 4 is inputted to both the intensity modulator 2 and the phase modulator 3.

The light beam from the light source 1 is intensity-modulated in the modulator 2 in accordance with the transmit signal supplied from the transmit signal generator 4 and at the same time undergoes a feeble phase modulation. For the purpose of compensating for or canceling out this feeble phase modulation which provides a cause for the chirping, the phase modulator 3 modulates the phase of the output signal of the intensity modulator 2 by using a signal which is derived from the output signal of the transmit signal generator 4, and which signal has a same magnitude as that of the output signal of the transmit signal generator 4 and a sign or polarity opposite to that of the latter.

Figure 15:
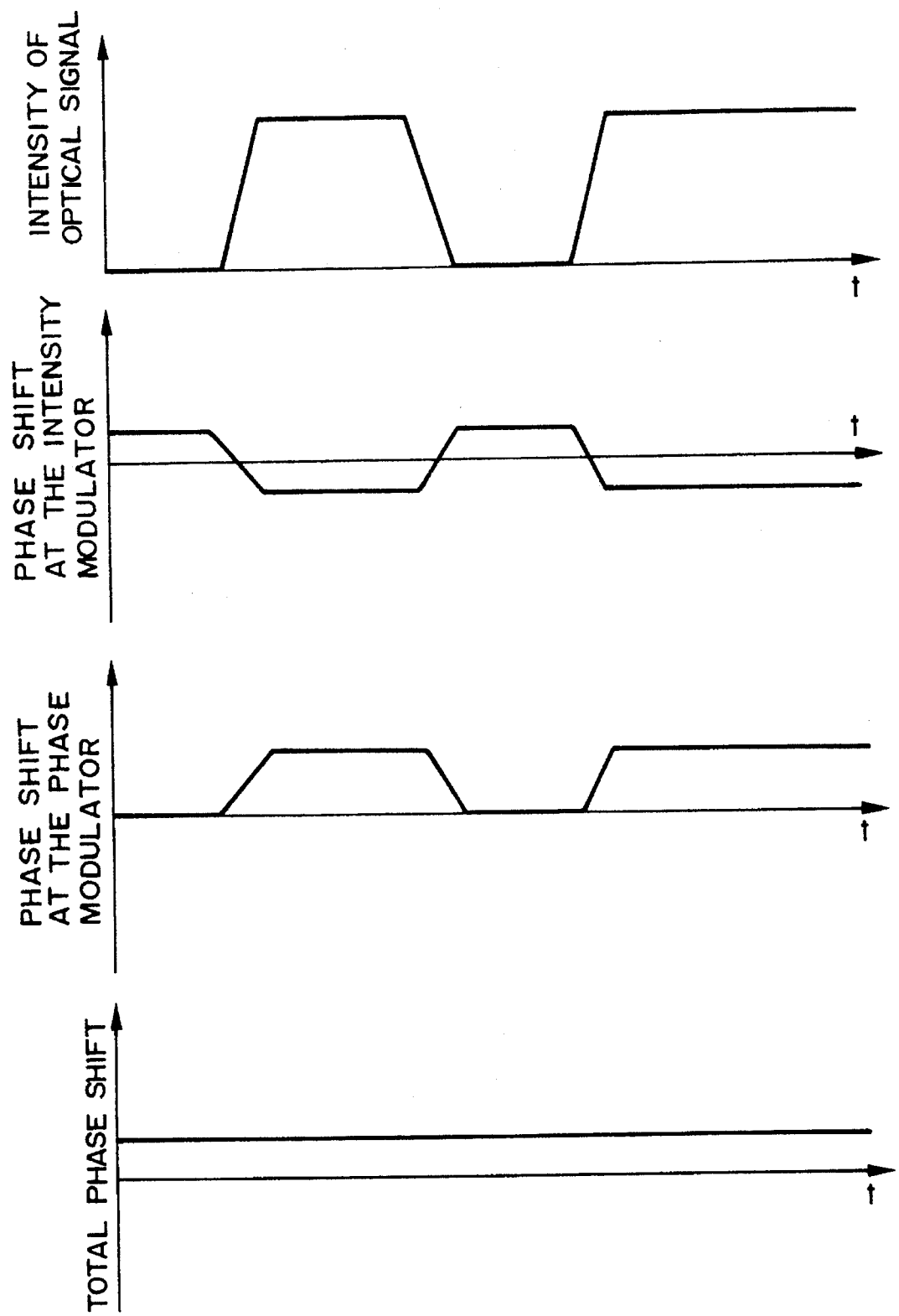
FIG. 15 is a waveform diagram for illustrating changes in intensity and phage in the optical transmitter apparatus according to the sixth embodiment.
Figure 16:
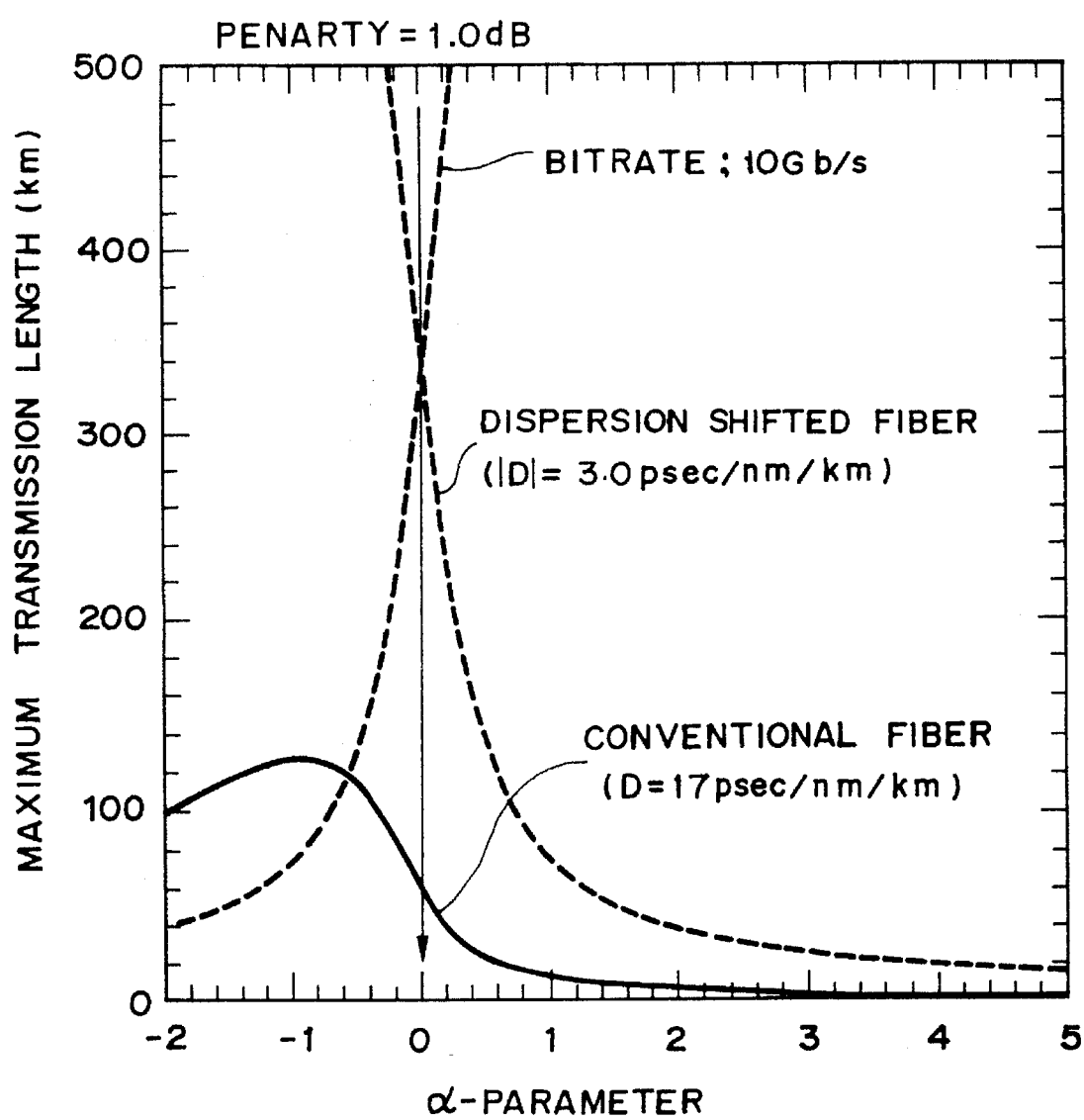
FIG. 16 is a chart for graphically illustrating relations between chirping characteristics of an optical modulator and a maximum transmission length.

By virtue of the arrangement described above, the phase modulation effectuated due to such chirping characteristic of the intensity modulate as illustrated in FIG. 15 can be compensated for (or canceled out) by the phase modulator 3, as a result of which an ideal optical signal suffering no chirping can be generated for transmission. FIG. 16 shows relations between the chirping characteristic of an optical modulator and a maximum transmission length. Most of the conventional intensity modulators exhibit the chirping characteristics on the order of 0.5 to 1.0 in terms of $\alpha$-parameter (an index of the chirping characteristic taken along the abscissa in FIG. 16), as a result of which serve limitation is imposed onto the maximum transmission length or distance. By contrast, when the configuration of the optical transmitter apparatus shown in FIG. 13 is adopted, the chirping can satisfactorily be suppressed (with the $\alpha$-parameter being equal to zero), whereby the maximum transmission length can be increased twice or third as long as that attainable with the optical transmitter apparatus in which the conventional intensity modulator is employed. Besides, with the structure of the instant embodiment, inverse chirping corresponding to a negative $\alpha$-parameter can easily be generated, whereby the maximum transmission length can further be increased about twice in the case of a conventional fiber (zero dispersion at 1.3 μm), as can be seen in FIG. 16.

Figure 17:
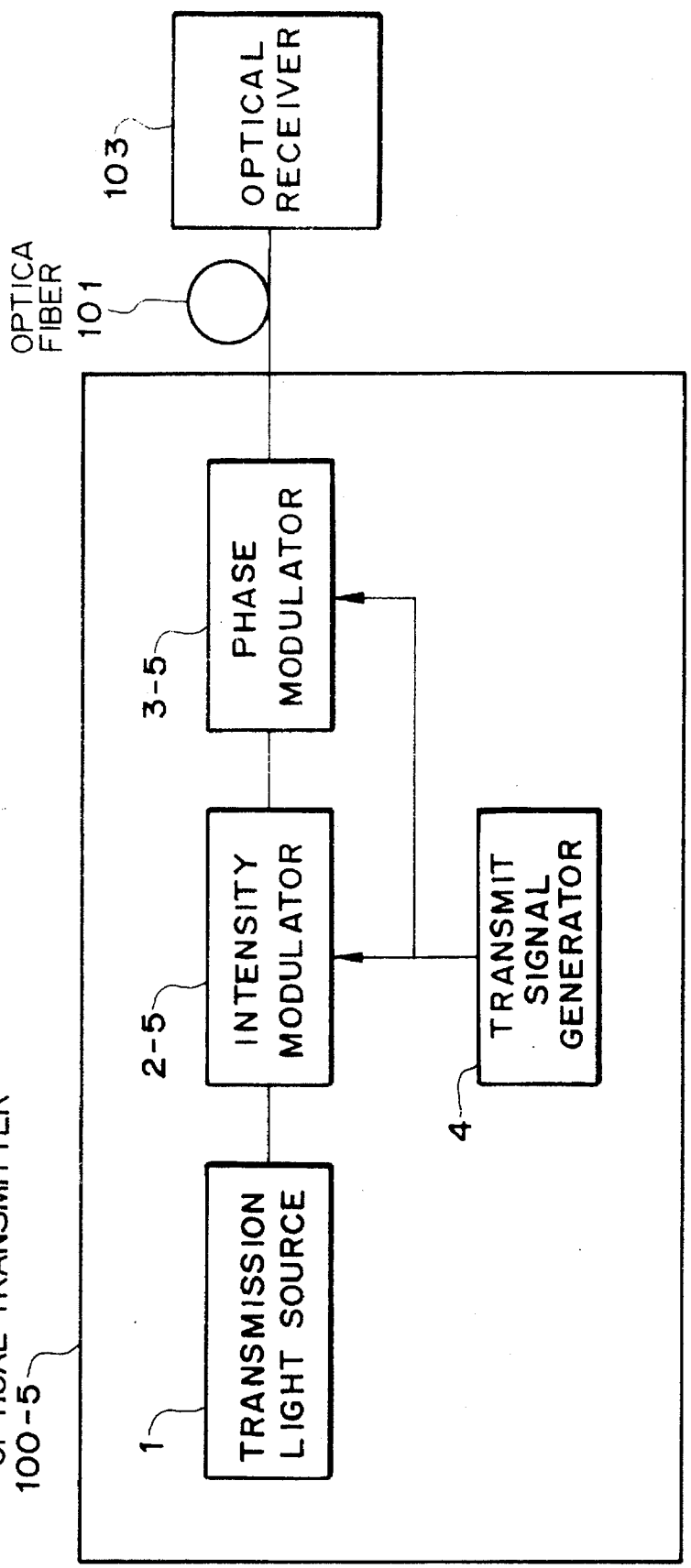
FIG. 17 is a block diagram showing schematically a structure of an optical signal transmission system according to an embodiment of the invention.

FIG. 17 shows a structure of an optical signal transmission system in which consideration is paid to the influence of dispersion of the optical fiber.

Referring to the figure, a signal to be transmitted, i.e., a transmit signal is generated by a transmit signal generator 4 and inputted to an intensity modulator 2-5 and a phase modulator 3-5. A light beam emitted from a transmission light source 1 is caused to pass through the intensity modulator 2-5 and the phase modulator 3-5 before being sent out from an optical transmitter apparatus 100-5. The output optical signal sent out from the optical transmitter apparatus 100-5 is transmitted through an optical fiber 101 to be inputted to an optical receiver apparatus 103.

The light beam emitted from the light source 1 is intensity-modulated by the optical intensity modulator 2-5 in accordance with the signal for transmission generated by the transmit signal generator 4. At that time, the optical signal undergoes a feeble phase shift. The phase modulator 3-5 serves to modulate the phase of the output signal of the optical intensity modulator 2-5 in accordance with the transmission signal generated by the transmit signal generator 4 so that it exhibits inverse chirping corresponding to a negative α-parameter shown in FIG. 16 so that degradation of the reception sensitivity due to the chirping which the signal undergoes during the transmission can be minimized.

According to the teaching of the invention incarnated in the instant embodiment, the optical phase modulation can be optimized for the optical signal transmitter inclusive of the optical fiber 101, whereby the transmission length or distance can further be increased when compared with the system in which the chirpless optical transmitter shown in FIG. 14 is employed.

Figure 18:
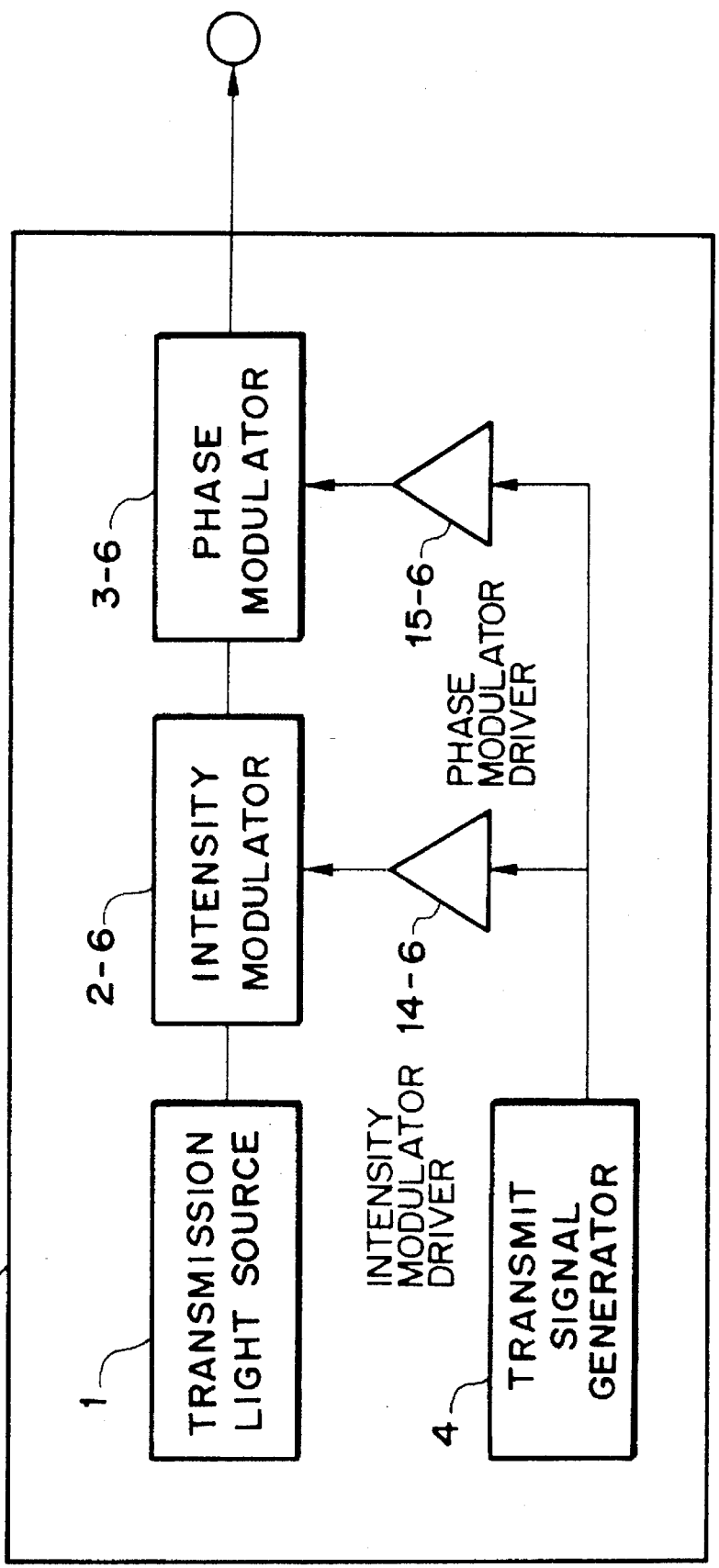
FIG. 18 is a block diagram showing schematically a structure of an optical transmitter apparatus according to a seventh embodiment of the invention.

FIG. 18 shows a structure of an optical transmitter apparatus according to a seventh embodiment of the invention in which driver circuits are employed for the intensity modulator and the phase modulator, respectively.

A light beam emanated from a light source 1 for optical signal transmission is sent out from an optical transmitter apparatus 100-6 after having passed through an intensity modulator 2-6 for modulating the light beam with a transmit signal (i.e., signal to be transmitted) and a phase modulator 3-6 for modulating the phase of the output optical signal from the intensity modulator 2-6. More specifically, an output signal of the transmit signal generator 4 is inputted to an intensity modulator driver circuit 14-6 to be shaped to an electric signal having a predetermined waveform for driving the intensity modulator 2-6. The output signal of the transmit signal generator 4 is also inputted to the phase modulator driver circuit 15-6 to be shaped to an electric signal having a predetermined waveform for driving the phase modulator 3-6.

The light beam from the light source 1 is intensity-modulated in the intensity modulator 2-6 in accordance with the transmit signal supplied from the transmit signal generator 4 and at the same time undergoes a feeble phase modulation or shift. For the purpose of compensating for or canceling out this phase modulation or shift which provides a cause for the chirping, the phase modulator 3-6 modulates the phase of the output signal of the intensity modulator 2-6 by using a signal which is derived from the output signal of the transmit signal generator 4, and which signal has a same magnitude as that of the output signal of the transmit signal generator 4 and a polarity opposite to that of the latter. To this end, the sense or sign as well as magnitude of the phase modulation can be regulated by adjusting the signal conversion characteristics of the intensity modulator driver circuit 14-6 and the phase modulator driver circuit 15-6.

In the case of the instant embodiment now under consideration, it is assumed that the optical transmitter is constituted by using a single intensity modulator and a single phase modulator. However, this is only for the purpose of simplification of description. It goes without saying that the characteristics of the transmitter apparatus described above can equally be realized by a combination of plural intensity modulators and plural phase modulators without departing from the scope and spirit of the invention. Further, the above-mentioned characteristics can be realized by using an intensity modulator having a chirping characteristic different from that of the intensity modulator 2-6 in place of the phase modulator 3-6, equally falling within the scope of the invention.

Figure 19:
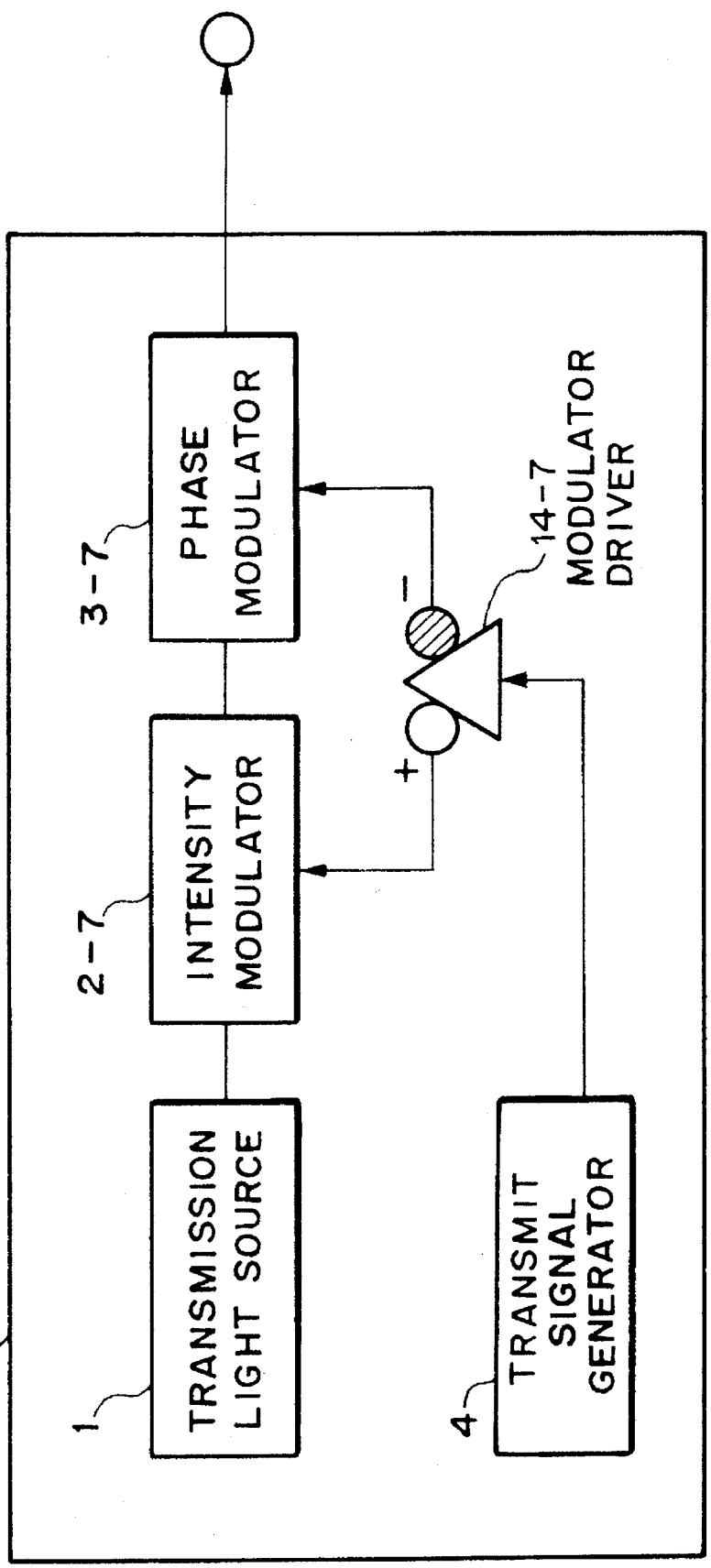
FIG. 19 is a block diagram showing schematically a structure of an optical transmitter apparatus according to a eighth embodiment of the invention.

FIG. 19 shows an optical transmitter apparatus according to an eighth embodiment of the invention in which a driver circuit is employed in common to both the intensity modulator and the phase modulator.

Referring to FIG. 19, a light beam emanated from a light source 1 for optical signal transmission is sent out from an optical transmitter apparatus 100-7 after having passed through an intensity modulator 2-7 for modulating the light beam with a signal to be transmitted and a phase modulator 3-7 for modulating the phase of the output optical signal of the intensity modulator 2-7. More specifically, a transmit signal outputted from a transmit signal generator 4 is inputted to an intensity modulator driver circuit 14-7 which produces two outputs having signs or polarities opposite to each other. These output signals are supplied to the intensity modulator 2-6 and the phase modulator 3-7, respectively.

In the case of the instant embodiment, the intensity modulator 2-7 and the phase modulator 3-7 are so designed as to have respective phase modulation characteristics which substantially coincide with each other. Accordingly, by driving the intensity modulator 2-7 and the phase modulator 3-7 with the signals having a same amplitude and opposite signs (polarities), effect of canceling out the phase modulation or shift accompanying the intensity modulation can be attained.

Figure 20A:
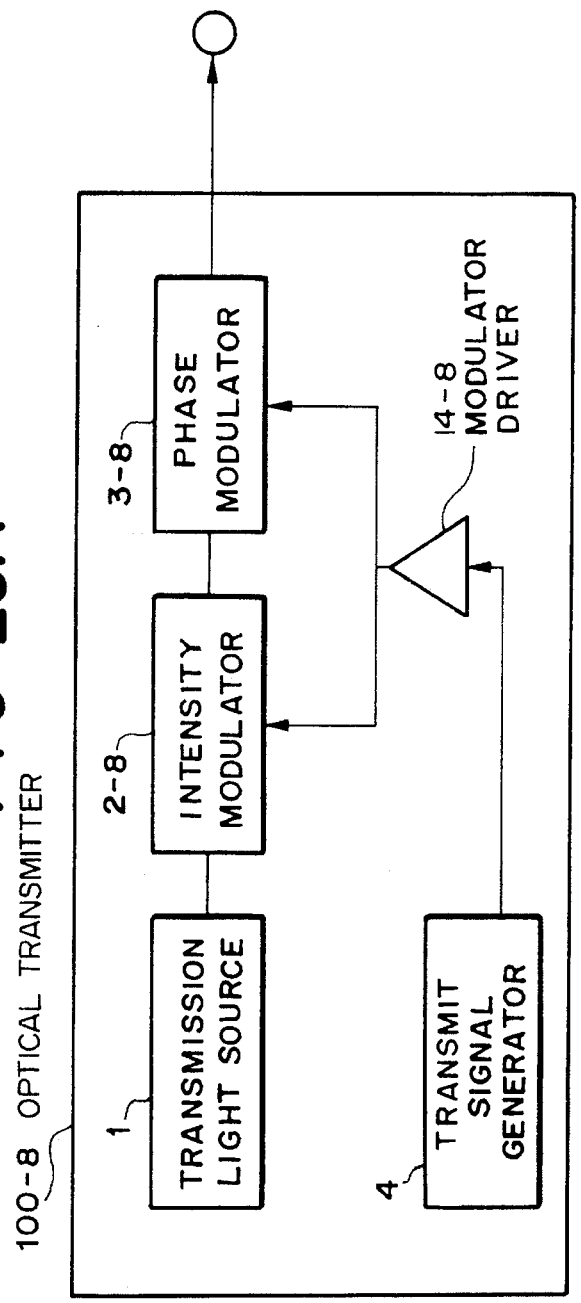
FIG. 20A is a block diagram showing schematically a structure of an optical transmitter apparatus according to a further embodiment of the invention.
Figure 20B:
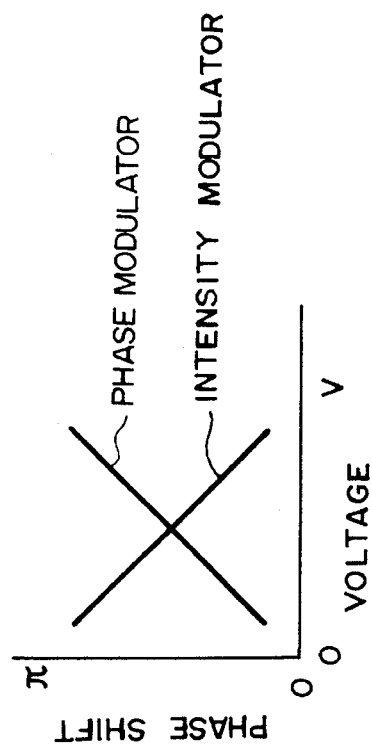
FIG. 20B is a view for graphically illustrating phase modulation characteristics of the optical transmitter shown in FIG. 20A.

FIG. 20A shows a structure of an optical transmitter apparatus according to a further embodiment of the invention in which a common driver circuit is employed, as in the case of the eighth embodiment described above. A light beam emanated from a light source 1 is caused to pass through an intensity modulator 2-8 and a phase modulator 3-8 before being transmitted as the optical signal from the optical transmitter apparatus 100-8. An output signal of a transmit signal generator 4 is supplied to an intensity modulator driver circuit 14-8 which produces two output signals supplied to the intensity modulator 2-8 and the phase modulator 3-8, respectively.

The intensity modulator 2-8 and the phase modulator 3-8 are so designed as to exhibit phase modulation or shift characteristics reverse to each other, as is illustrated in FIG. 19B. Thus, there can be obtained the effect of canceling out the phase shift by using a same drive signal.

With the optical transmitter configuration according to the eighth embodiment and the modification thereof shown in FIG. 19A, the structure of the modulator driver circuits can remarkably be simplified, to a further advantage.

Figure 21:
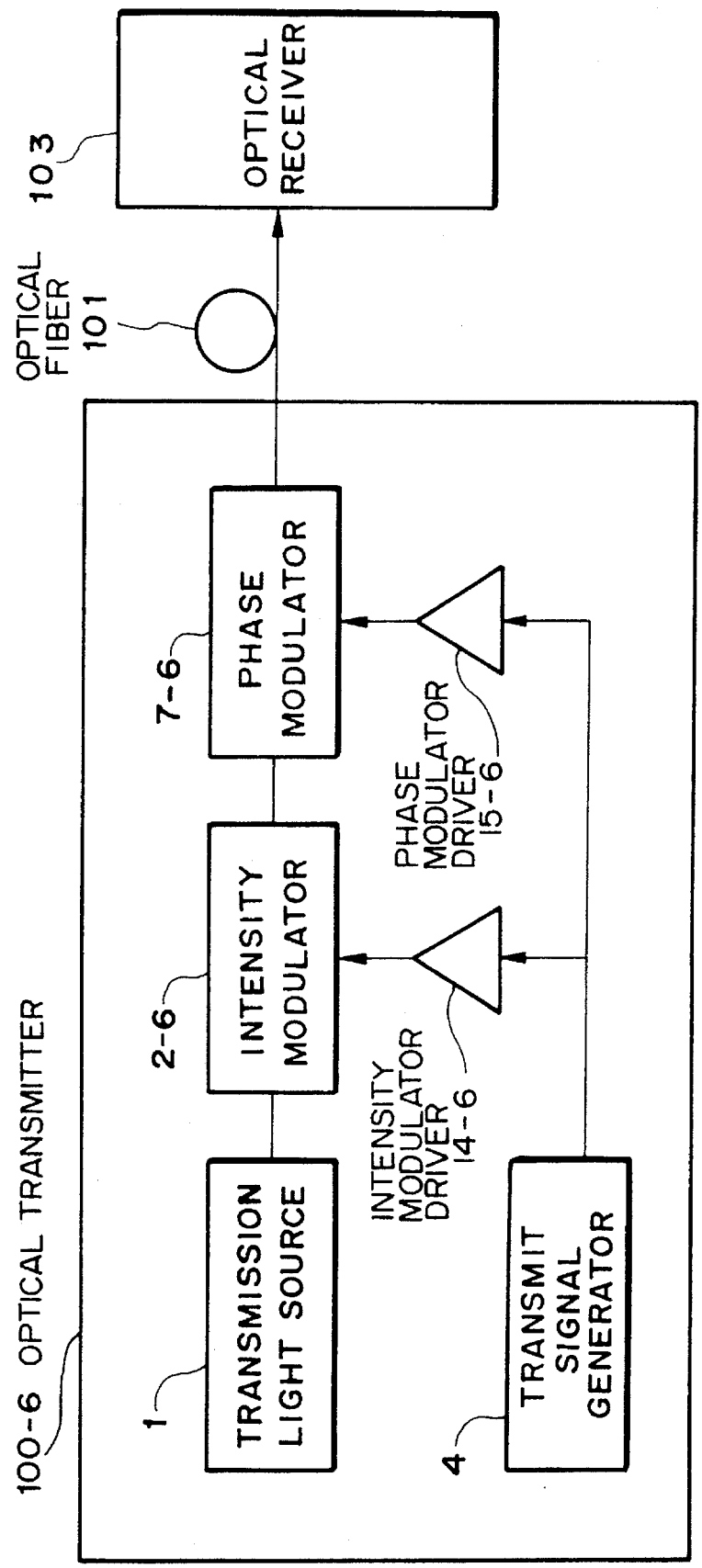
FIG. 21 is a block diagram showing schematically a structure of an optical signal transmission system in which the optical transmitter apparatus according to the seventh embodiment is employed.
Figure 22:
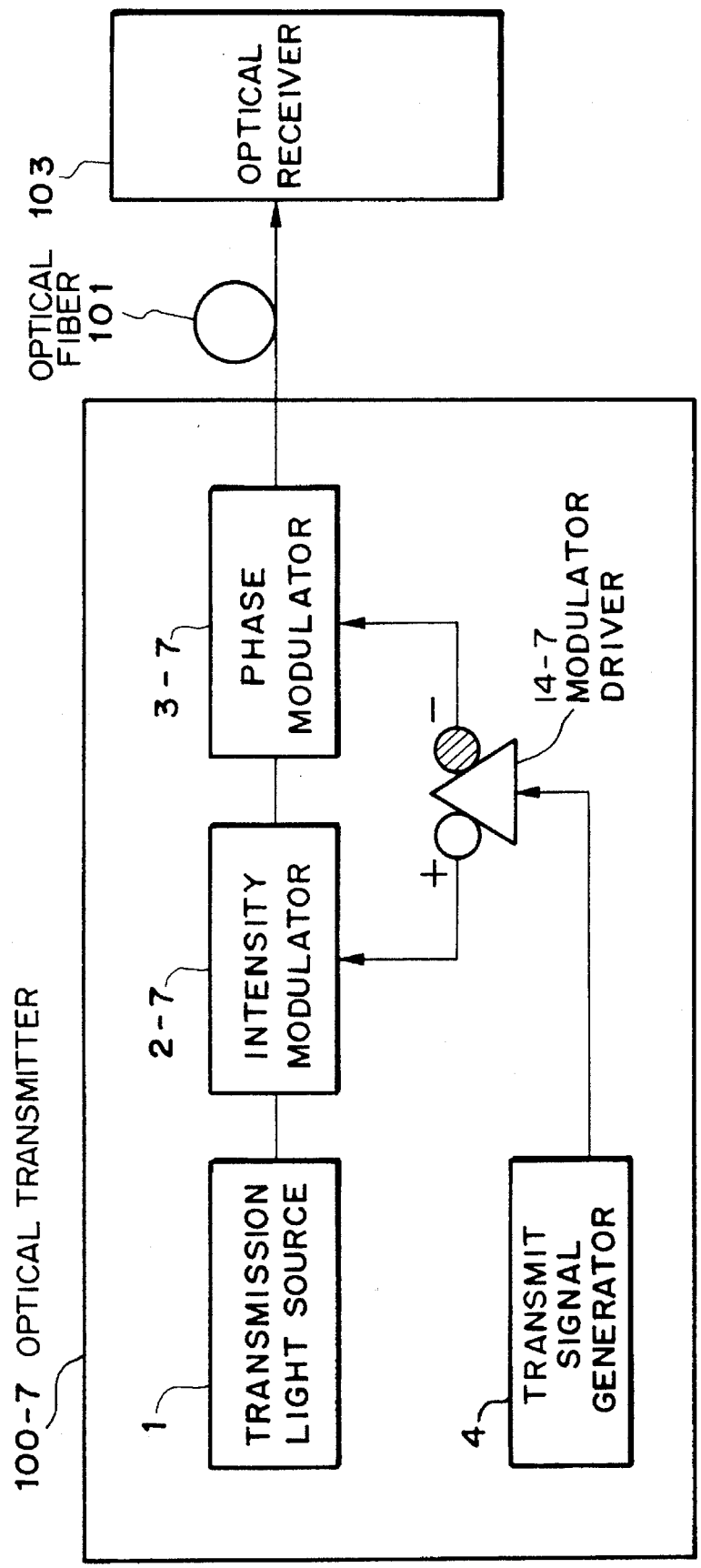
FIG. 22 is a block diagram showing schematically a structure of an optical signal transmission system in which the optical transmitter according to the eighth embodiment is employed.

At this juncture, it should be mentioned that the chirping taking place during the optical signal transmission through a conventional optical fiber can be optimized, as described hereinbefore in conjunction with FIG. 16, by using an optical transmitter apparatus of a structure similar to that of the seventh or eighth embodiment. FIG. 21 shows a structure of an optical signal transmission system in which the optical transmitter apparatus according to the seventh embodiment is employed. Further, FIG. 22 shows a structure of an optical signal transmission system in which the optical signal transmitter according to the eighth embodiment is employed. In both the figures, a reference numeral 100 denotes generally the optical transmitter, 101 denotes an optical fiber and 103 denotes an optical receiver.

By adjusting the phase modulation characteristics of the phase modulator 3-6 or 3-7, it is possible to suppress to a minimum the degradation of reception sensitivity brought about by the chirping which the optical signal suffered in the course of traveling through the optical fiber 101. To this end, the phase of the optical signal is modulated in accordance with the transmit signal supplied from the transmit signal generator 4 so that the chirping is optimized (i.e., so that the chirping of opposite sign corresponding to the α-parameter of negative sign becomes effective).

According to the optical signal transmission system described above, because the optical phase shift can be optimized for the whole system inclusive of the optical fiber, the transmission length or distance can further be increased when compared with the system in which the chirpless optical transmitter is employed.

The intensity modulator 2 or 2-n and the phase modulator 3 or 3-n may be implemented by any appropriate modulator. Further, as the material for the modulator, there may be conceived various materials or compositions such as semiconductor bulk crystals of GaAs, InP or the like, a semiconductor quantum well (MQW) structure, dielectrics such as $LiNbO_3$ and others. Further, the modulator may be implemented in any desired structure in which electrooptic effect or electroabsorption effect or the like is made use of. Besides, in place of combining the discrete modulators shown in FIG. 18, the individual modulators may be implemented on a single substrate in an integrated structure. In this case, the structure of the optical transmitter apparatus can remarkably be simplified while ensuring stable and high-efficiency optical coupling between the intensity modulator element and the phase modulator element.

Figure 23A:
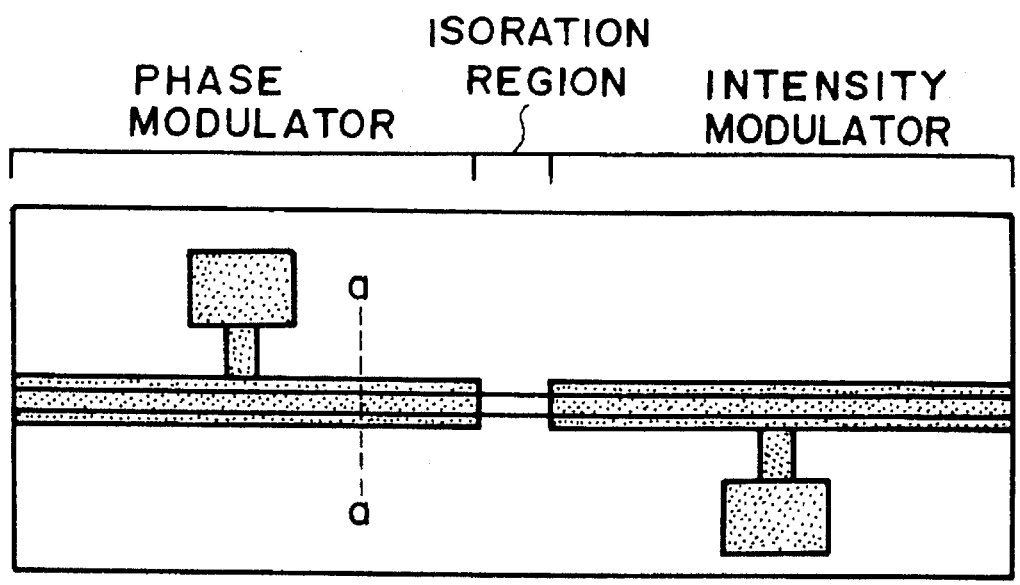
FIG. 23A is a sectional view showing an integrated structure of an optical modulator including a phase modulator and an intensity modulator each of a same structure and implemented in an integrated structure.
Figure 23B:
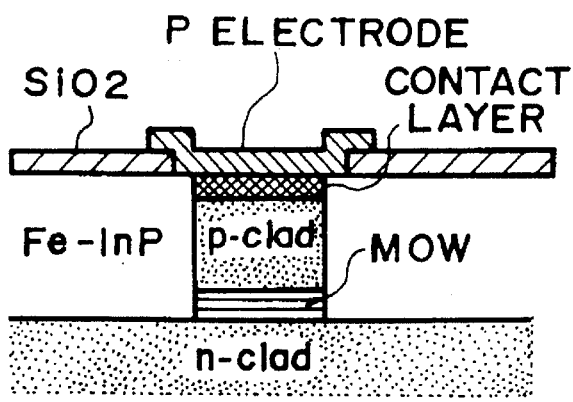
FIG. 23B is a cross-sectional view taken along a line a—a' in FIG. 23A.
Figure 24:
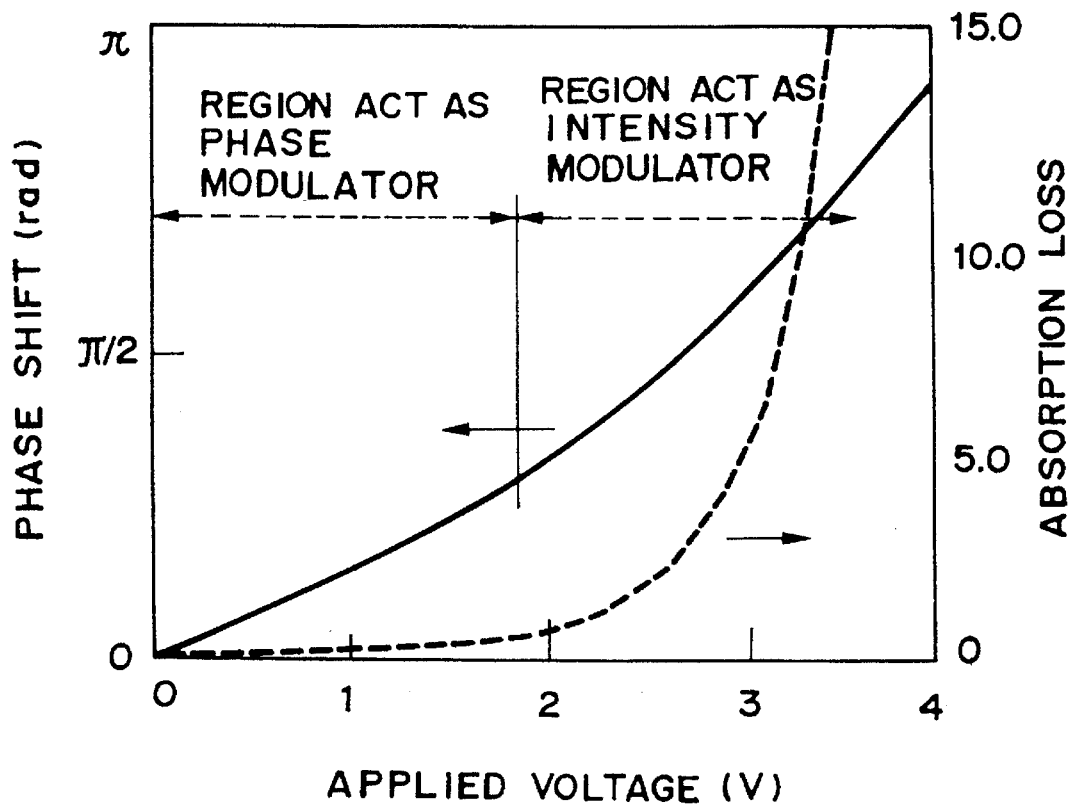
FIG. 24 is a view for graphically illustrating relations of phase change and absorption loss to a voltage applied to an optical modulator element.

FIG. 23A shows an integrated structure of an intensity modulator element 2 and a phase modulator element 4, which is realized by using a semiconductor multiple quantum well structure. FIG. 23B shows a cross-section taken along a line a—a' in FIG. 23A. Further, FIG. 24 graphically illustrates characteristics of the intensity modulator element and the phase modulator element exhibited for applied bias voltages. As can be seen in FIG. 24, by regulating magnitude of the applied bias voltage, operation characteristics of the modulators can easily be controlled or changed. More specifically, by applying a higher bias voltage to the intensity modulator element than the phase modulator element, absorption coefficient of the multiple quantum well is caused to change more significantly, whereby the degree of intensity modulation is increased. Of course, change in the intensity will take place more or less even in the phase modulator element. However, magnitude of such change can be suppressed to a sufficiently small value when compared with that of the intensity modulator element, to ensure desired operation.

An optical modulator device in which the intensity modulator 2 and the phase modulator 3 described hereinbefore in conjunction with the seventh and eighth embodiments are implemented in an integrated structure can easily be realized.

Figure 25:
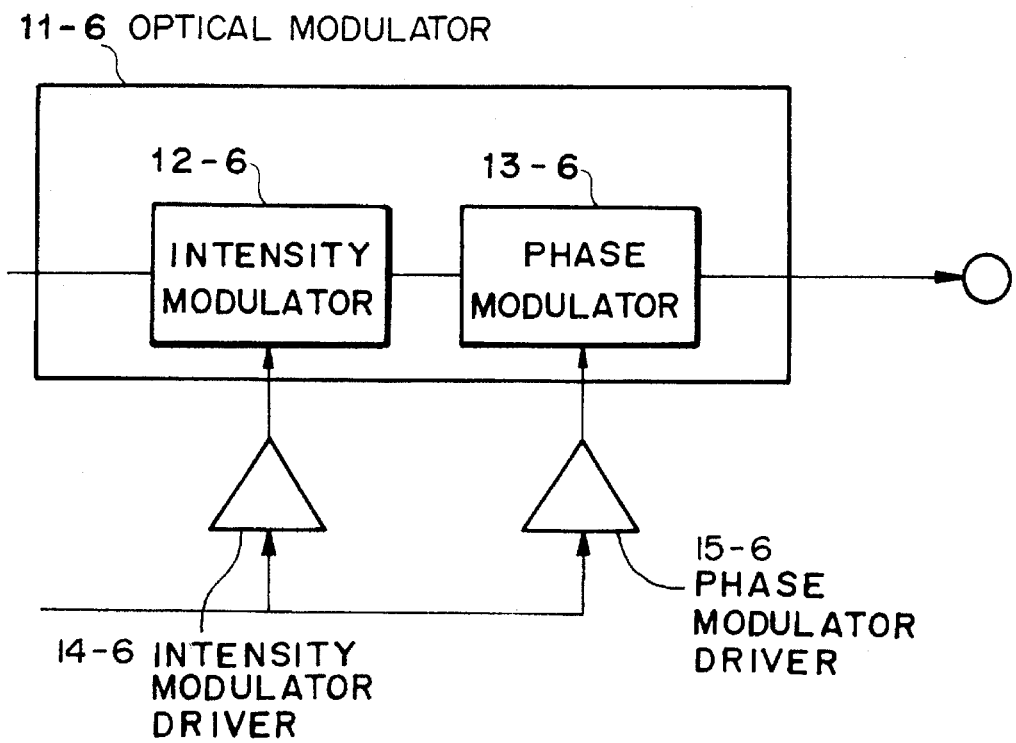
FIG. 25 is a block diagram showing schematically a structure of an optical modulator according to an embodiment of the invention.

FIG. 25 shows a structure of an optical modulator having a structure corresponding to that of the seventh embodiment. Referring to FIG. 25, the optical modulator 11-6 is comprised of an intensity modulator element 12-6 and a phase modulator element 13-6 which are optically coupled in series to each other. The intensity modulator element 12-6 is driven by a signal generated by an intensity modulator driver circuit 14-6 while the phase modulator element 13-6 is driven by an output signal of a phase modulator driver circuit 15-6, as in the case of the seventh embodiment.

Figure 26:
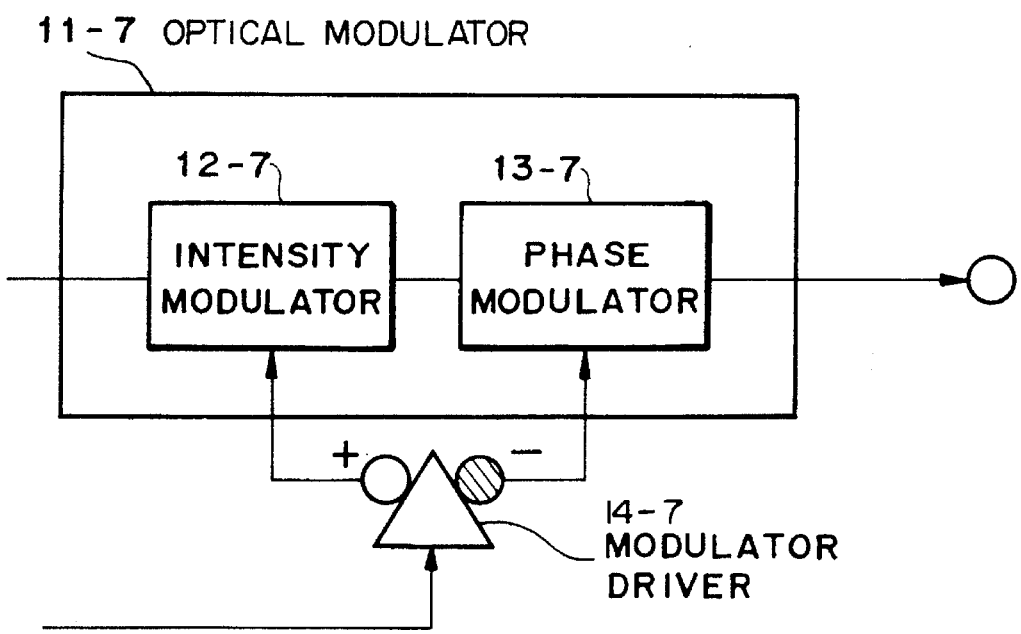
FIG. 26 is a block diagram showing schematically a structure of an optical modulator according to another embodiment of the invention.

FIG. 26 shows a structure of an optical modulator having a structure corresponding to that of the eighth embodiment. Referring to FIG. 26, the optical modulator 11-7 is comprised of an intensity modulator element 12-7 and a phase modulator element 13-7 which are optically coupled in series to each other. The intensity modulator element 12-7 is driven by a signal of positive (plus) polarity generated by an intensity modulator driver circuit 14-7 while the phase modulator element 13-7 is driven by a negative (minus) output signal of a phase modulator driver circuit 15-7, as in the case of the eighth embodiment.

Figure 27:
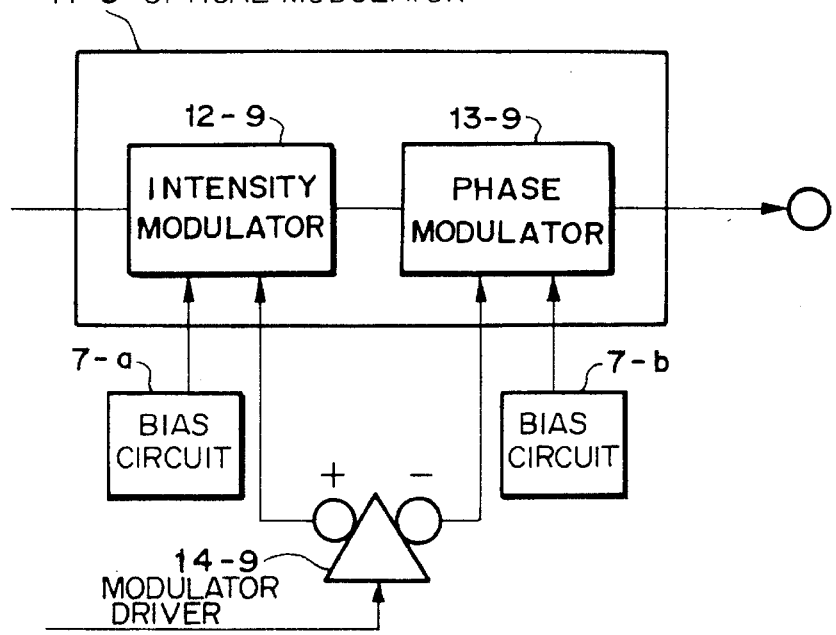
FIG. 27 is a block diagram showing schematically a structure of an optical modulator according to a further embodiment of the invention.

FIG. 27 shows a circuit configuration in which the modulation characteristics of an integrated optical modulator are adapted to be controlled by a bias signal. Referring to FIG. 27, an optical modulator 11-9 is composed of an intensity modulator element 12-9 and a phase modulator element 13-9. The intensity modulator element 12-9 is driven by an output signal of plus sign generated by an intensity modulator driver circuit 14-9, while the phase modulator element 13-9 is driven by a signal of minus sign generated by the intensity modulator driver circuit 14-9. In other words, the intensity modulator driver circuit 14-9 generates two output signals having opposite polarities, wherein the output signal of positive polarity (plus sign) is supplied to the intensity modulator element 12-9, while the output of negative polarity (minus sign) is supplied to the phase modulator element 13-9. An output signal of a bias circuit 7-a is applied to the intensity modulator element 12-9 for controlling the intensity/phase modulation characteristics thereof. On the other hand, a bias signal outputted from a bias circuit 7-b is applied to the phase modulator element 13-9 for controlling the intensity/phase modulation characteristics of the latter.

By providing the bias circuit 7-a, it is possible to realize high-efficient intensity modulation characteristics of the intensity modulator element 12-9. Further, owing to provision of the bias circuit 7-b, it is possible to make the phase modulation characteristic of the phase modulator element 13-9 coincide substantially with that of the intensity modulator element 12-9. Besides, by employing the bias circuits 7-a and 7-b, as mentioned above, accurate or precise adjustment of the modulation characteristics can be realized with a simplified structure, to another advantage.

Figure 28:
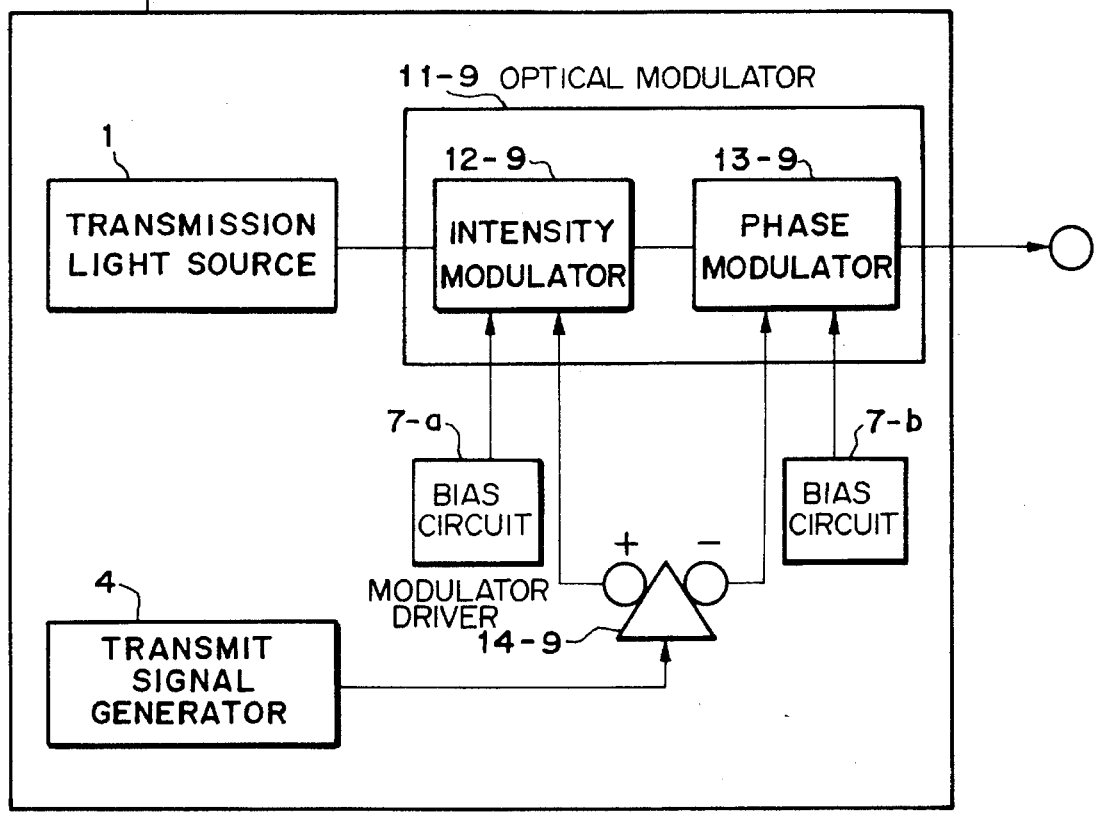
FIG. 28 is a block diagram showing schematically a structure of an optical modulator according to yet another embodiment of the invention.

FIG. 28 shows a structure of an optical transmitter apparatus according to a ninth embodiment of the invention which includes an optical modulator 11-9 controllable by the bias circuits 7-a and 7-b mentioned above.

Referring to FIG. 28, a light beam emitted from a light source 1 is inputted to an optical modulator 11-9, wherein the light beam is caused to pass though an intensity modulator element 12-9 and a phase modulator element 13-9 before being sent out from the optical transmitter apparatus 100-9. A signal to be transmitted is generated by a transmit signal generator 4 and supplied to an intensity modulator driver circuit 14-9 which is designed to output two signals of opposite polarities, wherein the signal of positive polarity (plus sign) is supplied to the intensity modulator element 12-9, while the output signal of negative polarity (minus sign) is inputted to the phase modulator element 13-9. An output signal of the bias circuit 7-*a* is applied to the intensity modulator element 12-9 for the purpose of controlling the intensity/phase modulation characteristics thereof. On the other hand, an output signal of the bias circuit 7-*b* is applied to the phase modulator element 13-9 for controlling the intensity/ phase modulation characteristics of the phase modulator elements 13-9.

It is possible to realize high-efficiency intensity modulation characteristics of the intensity modulator element by using the bias circuit 7-*a*, while the bias circuit 7-*b* is effective for making the phase modulation characteristic of the phase modulator element 13-9 coincide substantially with that of the intensity modulator element 12-9. Besides, adoption of the bias circuits allows the modulation characteristics to be adjusted or controlled accurately with a simplified structure of the optical transmitter apparatus.

According to the present invention, a chirpless optical signal transmission system can easily be realized.

Figure 29A:
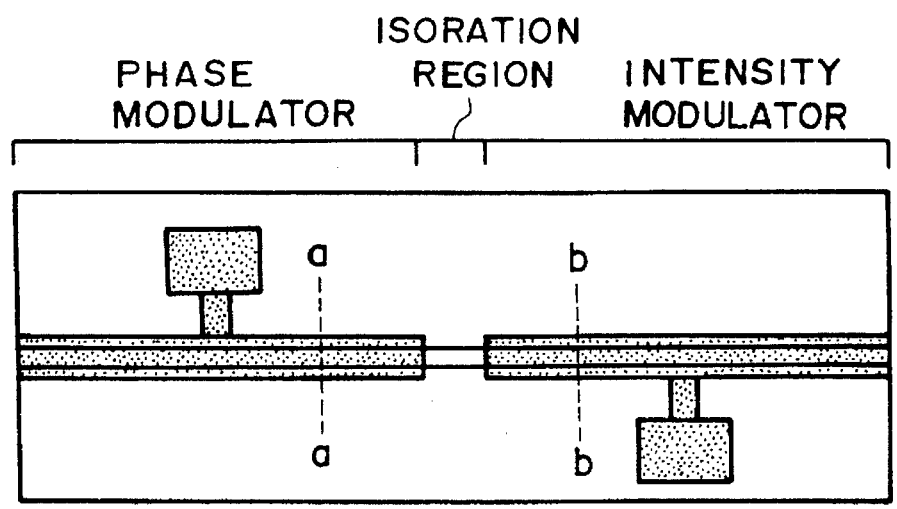
FIG. 29A is a view showing an integrated structure of an optical modulator according to an embodiment of the invention.
Figure 29B:
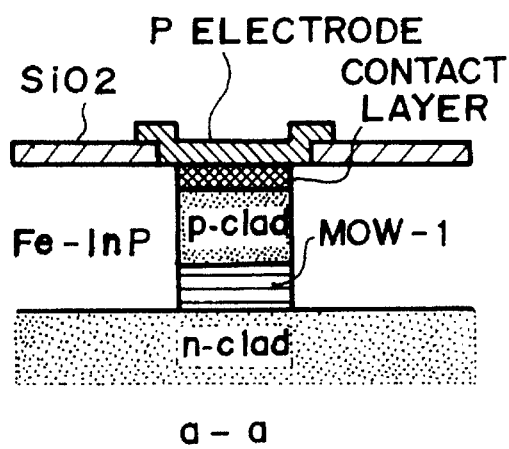
FIGS. 29B and 29C are sectional views taken along lines a—a' and b—b', respectively, in FIG. 29A.
Figure 29C:
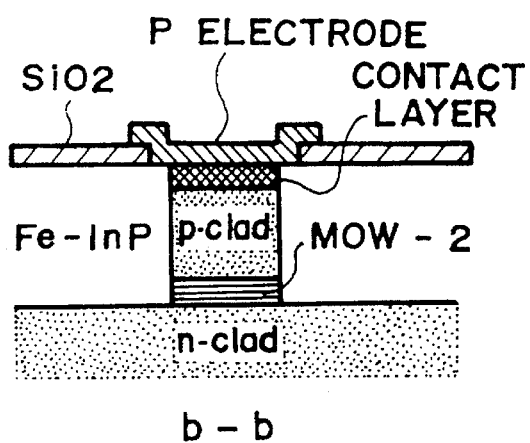
Figure 30A:
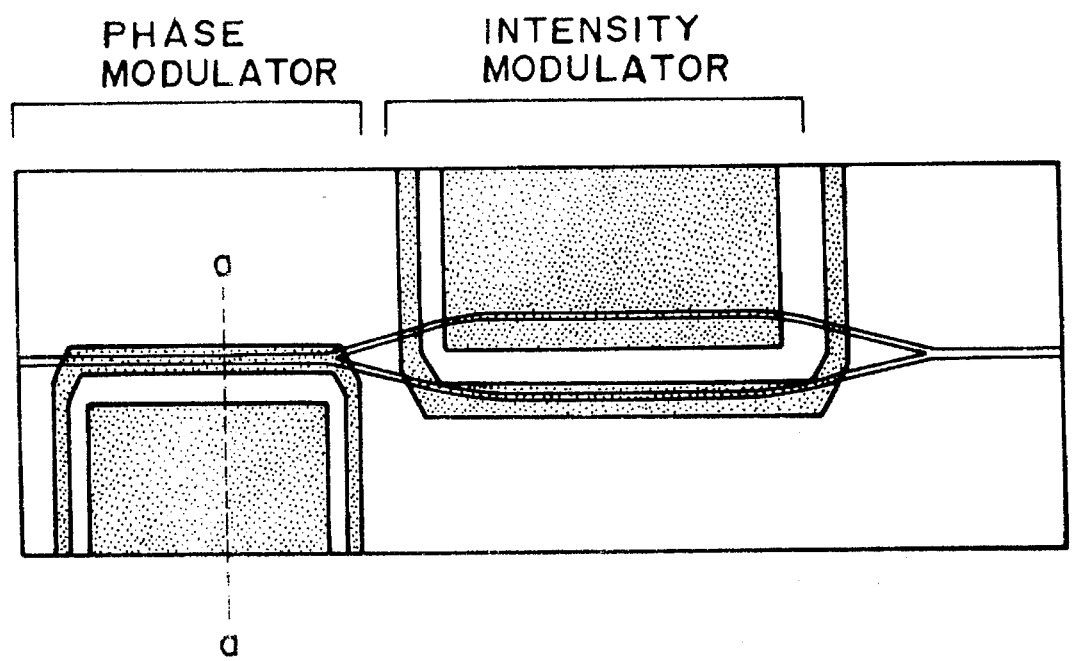
FIGS. 30A and 30B are views showing an integrated structure of an optical modulator realized by using a dielectric.
Figure 30B:
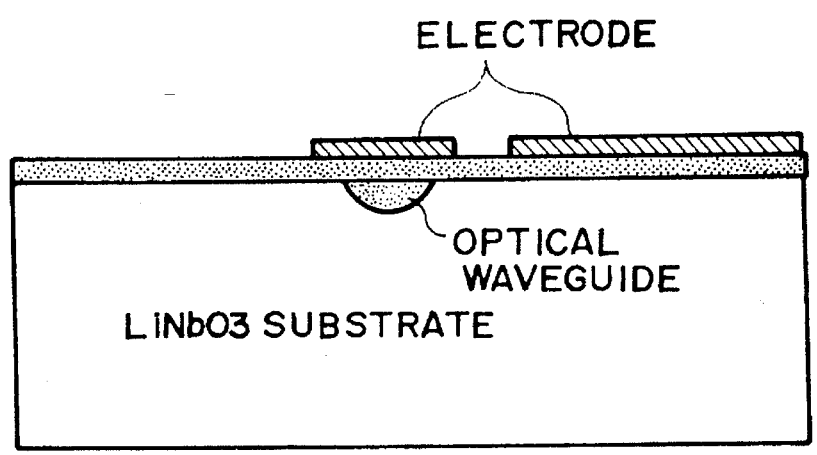

FIG. 29A shows an integrated structure of an optical modulator in which multiple quantum well structures having mutually different characteristics are adopted for a phase modulator element and an intensity modulator element, respectively. Further, FIGS. 29B and 29C are sectional views taken along lines a—a' and b—b' in FIG. 29A, respectively. With the structure shown in these figures, the intensity modulation characteristics and the phase modulation characteristic are isolated more distinctly when compared with the structure shown in FIG. 23. The structure shown in FIGS. 29A, 29B and 29C becomes advantageous over that shown in FIG. 23 because the modulator elements can be optimized independent of each other although the manufacturing process of the integrated optical modulator device shown in FIGS. 29A, 29B and 29C is complicated. FIGS. 30A and 30B show an integrated optical transmitter structure realized by using a dielectric. The intensity modulator element is implemented in a Mach-Zehnder interferometer structure, while the phase modulator element is implemented in the form of a linear waveguide. It should however be understood that the intensity modulator element can be implemented in other various structures inclusive of a directional coupler type intensity modulator and the like so far as the underlying operation principle is based on the electrooptical effect. Furthermore, similar device structure can be obtained when the electrooptical effect of semiconductor crystal such as GaAs, InP and the like is made use of.

It should be noted that an optical transmitter apparatus which can achieve the first and second objects of the invention simultaneously is also intended to be encompassed by the scope of the present invention.

Figure 31:
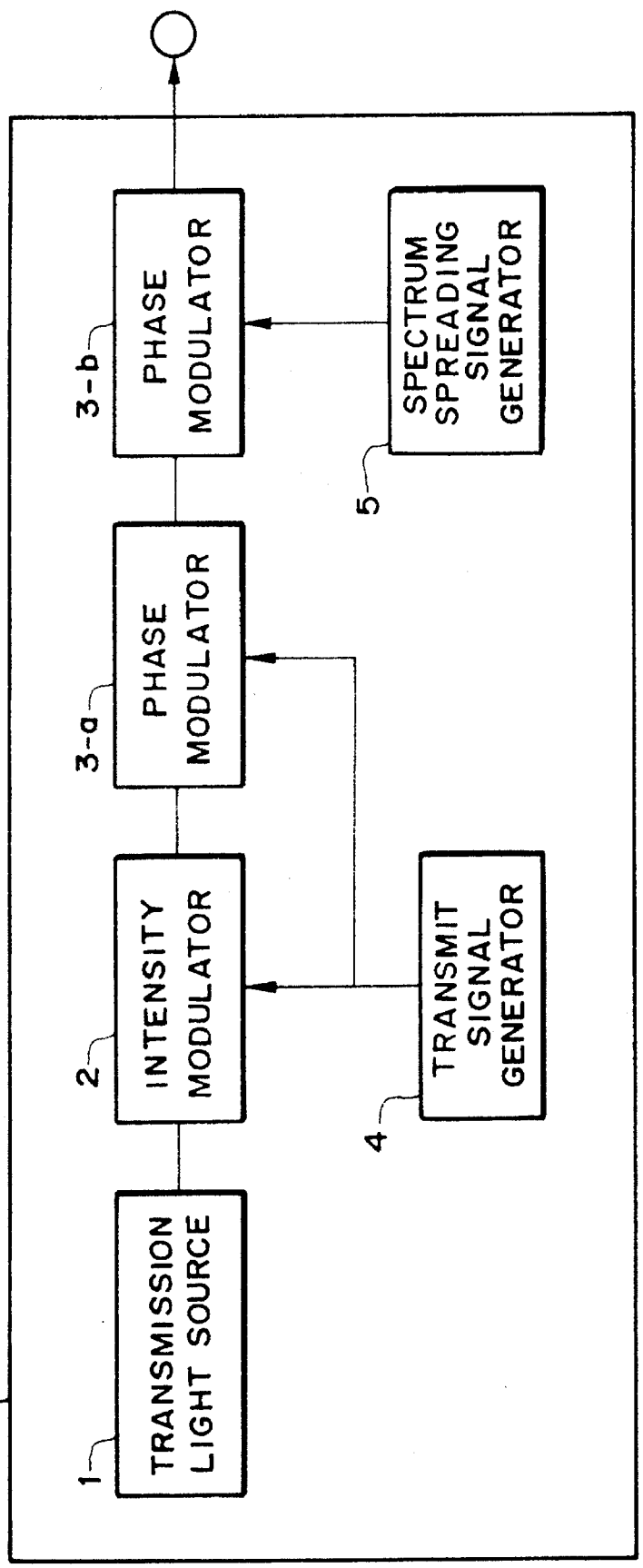
FIG. 31 is a block diagram showing a configuration of an optical transmitter apparatus according to another embodiment of the invention which corresponds to a combination of the first and sixth embodiments.

FIG. 31 shows a structure of an optical transmitter apparatus which corresponds to a combination of the first and sixth embodiments of the invention.

Referring to the figure, the optical transmitter apparatus 100 is composed of a light source 1 for signal transmission, an intensity modulator 2, phase modulators 3-*a* and 3-*b*, a transmit signal generator 4 and a spectrum spreading signal generator 5. A signal to be transmitted which is generated by a transmit signal generator 4 is supplied to the intensity modulator 2 and the phase modulator 3-*a*. An output signal of the spectrum spreading signal generator 5 is inputted to the phase modulator 3-*b*. The light beam emanated from the light source 1 is caused to pass through the intensity modulator 2 and the phase modulators 3-*a* and 3-*b* before being sent out from the optical transmitter apparatus 100.

The light beam emanated from the light source 1 undergoes intensity modulation and feeble phase modulation or shift upon passing through the intensity modulator 2. Subsequently, upon passing through the phase modulator 3-*a*, the optical signal outputted from the intensity modulator 2 undergoes a phase modulation which can cancel out the feeble phase modulation or shift which the signal suffered upon passing through the intensity modulator 2. The output signal of the phase modulator 3-*a* is further subjected to a phase modulation by the phase modulator 3-*b* which is effective for spreading the spectrum of the optical signal.

With the structure of the optical transmitter apparatus shown in FIG. 31, not only the stimulated Brillouin scattering but also the chirping in a high frequency region equivalent to the bit rate can be suppressed, to an advantageous effect.

Figure 32:
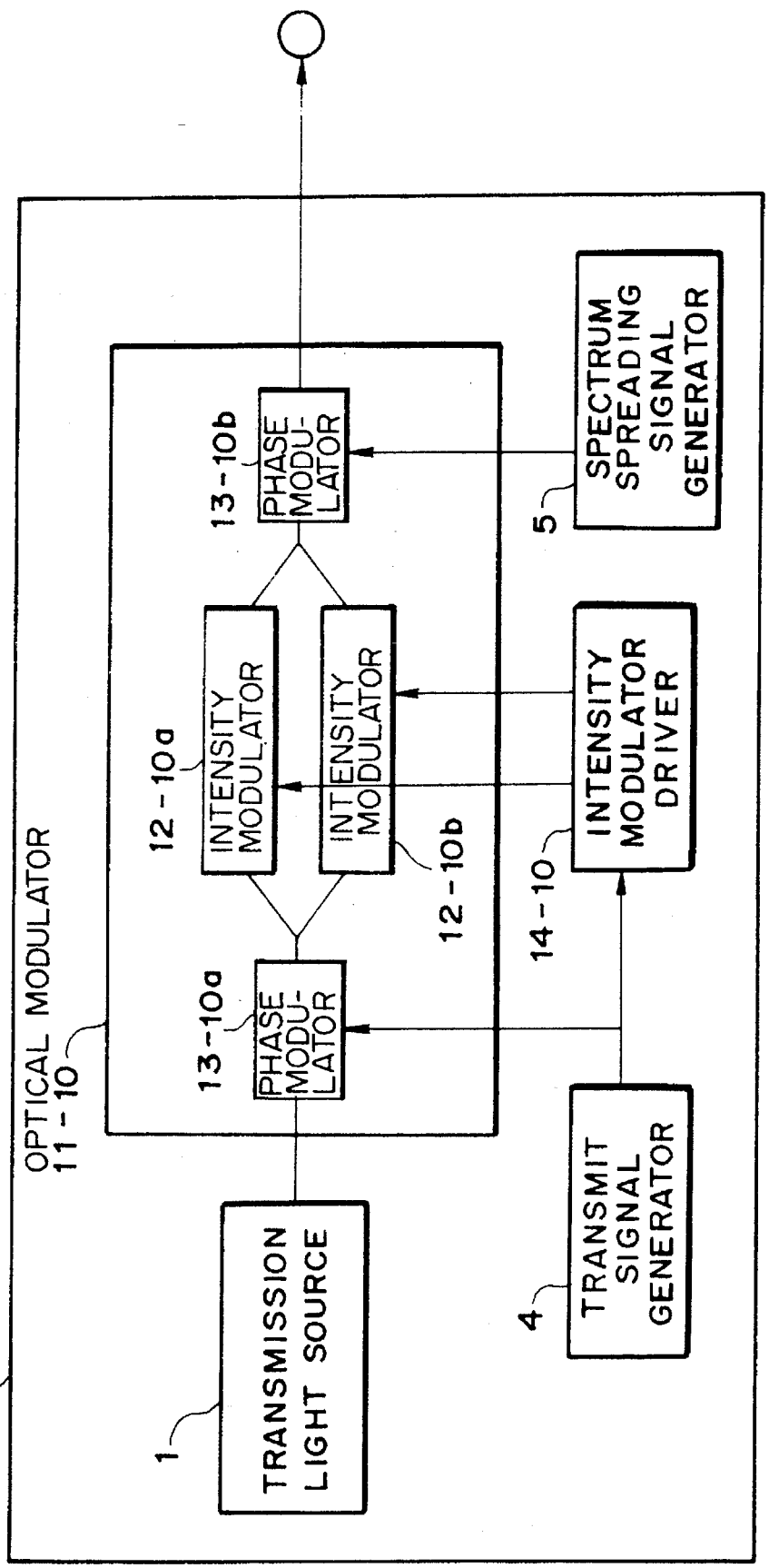
FIG. 32 is a block diagram showing a structure of an optical transmitter in which an optical intensity modulator and an optical phase modulator are integrated with each other.

FIG. 32 shows, by way of example a structure of an optical transmitter in which an optical intensity modulator and an optical phase modulator are integrated with each other. Owing to the integrated structure, optical loss at the coupling parts can be reduced. Besides, the number of optical elements which will otherwise be required can be decreased.

Figure 33:
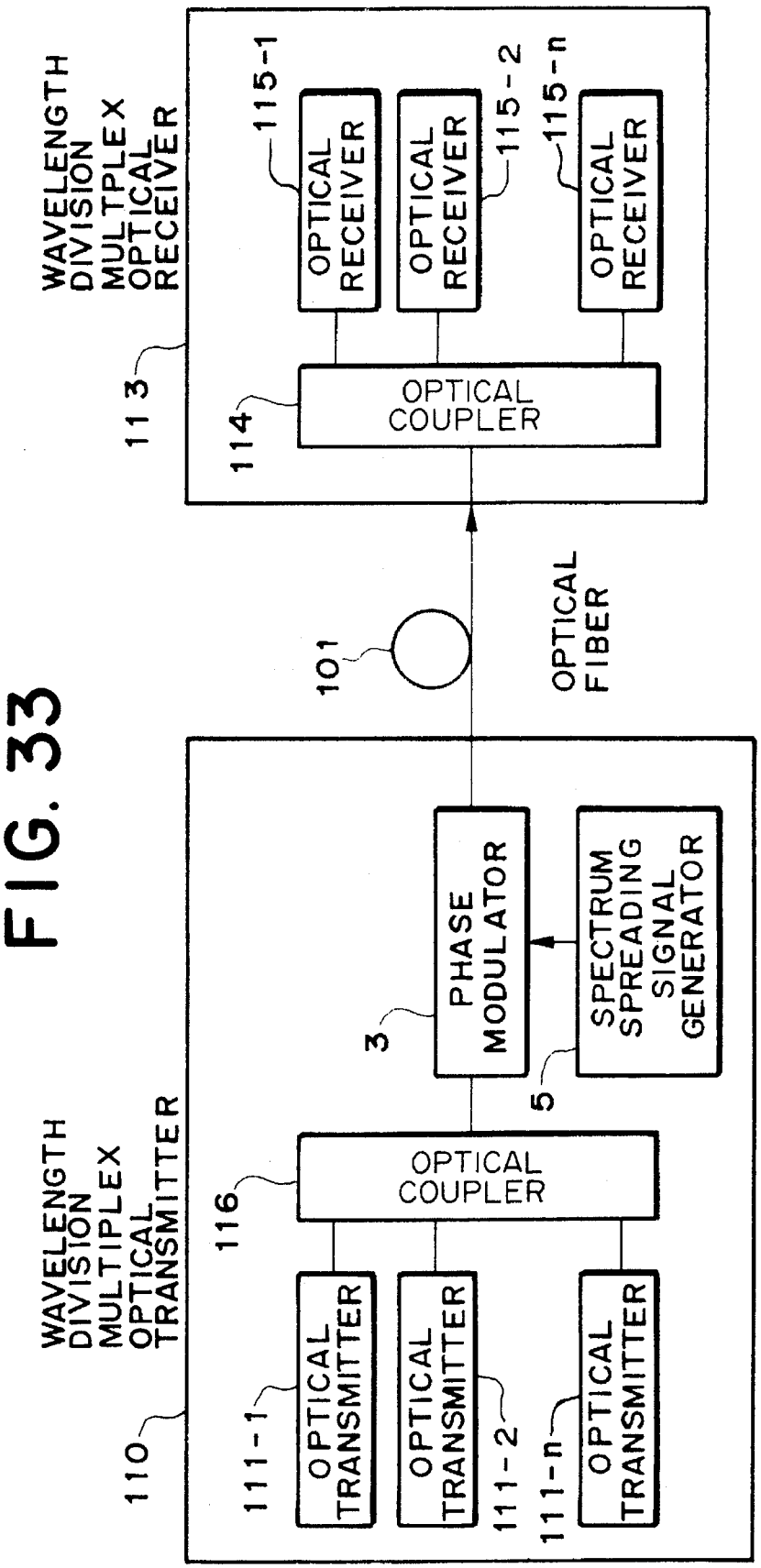
FIG. 33 is a block diagram showing schematically a structure of a waveform division multiplex optical signal transmission system according to yet another embodiment of the present invention.

According to the teaching of the present invention, it is also possible to suppress the stimulated Brillouin scattering by spreading the spectrum of a wavelength-multiplexed optical signal by means of a single phase modulator. FIG. 33 shows schematically a structure of a waveform division multiplex optical transmission system according to yet another embodiment of the invention.

Each of optical transmitters 111-1, 111-2, . . . , 111-n includes no optical phase modulator designed for spectrum spreading. Basically, each optical transmitter is composed of a light source, an intensity modulator and a signal generator for generating a signal to be optically transmitted. A plurality of optical signals generated by the individual intensity modulators and having mutually different wavelengths are optically synthesized by an optical coupler 116. The synthesized signal light beam undergoes en bloc a phase modulation in an optical phase modulator 3 in accordance with a signal generated by a spectrum spreading signal generator 5. The wavelength division multiplexed optical signal undergone the phase modulation is sent out onto an optical fiber 1001 from the wavelength multiplex division transmitter apparatus 110, and received by an optical wavelength demultiplexer 114 to be demultiplexed into the original wavelengths. Optical signals resulting from the optical demultiplexing are received by individual optical receivers 115-1, 115-2, . . . , 115-n, respectively.

In the optical wavelength division multiplex signal transmission system described above, the stimulated Brillouin scattering can be suppressed to a minimum because spectrum of the optical signal is spread.

In the system described above by reference to FIG. 33, the optical transmitter apparatus 111 has been described as being composed of the light source, the intensity modulator and the transmit signal generator. It should however be understood that the optical transmitter apparatus may include a phase modulator for suppressing the chirping phenomenon. Parenthetically, the optical coupler 116 employed for synthesization of the optical signals may be replaced by an optical wavelength multiplexer.

As will now be understood from the foregoing description, the stimulated Brillouin scattering can effectively be suppressed according to the teaching of the present invention that the optical signal undergone an optical phase modulation is transmitted.

Furthermore, by controlling the clock generator circuit of the optical transmitter apparatus by using the spectrum spreading signal, reception sensitivity can be protected against degradation due to the time jitter.

It should further be mentioned that the optical chirpless signal transmission can easily be realized by using a phase modulator for compensating for a phase modulation which accompanies the operation of the intensity modulator.

Finally, it should be added that by implementing the optical intensity modulator and the optical phase modulator in an integrated structure, light energy loss at inter-element coupling or connecting portions can be reduced with the number of optical elements being decreased, to further advantages.

We claim:

1. An optical transmitter apparatus, comprising a light source for signal transmission, a Mach-Zehnder type intensity modulator including two phase modulator parts, a transmit signal generator, a signal generator and an intensity modulator driver circuit including at least two voltage combine circuits, wherein a transmission signal for transmission is generated by said transmit signal generator and inputted to one of said voltage combine circuits as a signal of positive polarity while being inputted to the other one of said voltage combine circuits as a signal of negative polarity, and a signal generated by said signal generator is inputted to said two voltage combine circuits as a signal of same polarity, the outputs of said voltage combine circuits being supplied to said two phase modulator parts, respectively, of said Mach-Zehnder type intensity modulator as outputs of said intensity modulator driver circuit, wherein a light beam emitted from said light source undergoes intensity modulation and phase modulation in said Mach-Zehnder type intensity modulator to be thereby spread in spectrum, the output signal of said Mach-Zehnder type intensity modulator being sent out as an optical signal for transmission.

2. An optical transmitter apparatus according to claim 1, wherein said signal generator generates a sinusoidal waveform signal of a frequency lower than a bit rate of said transmit signal generated by said transmit signal generator.

3. An optical transmitter apparatus according to claim 1, wherein said signal generator generates a rectangular waveform signal of a period same as or longer than a bit duration time of said transmit signal in synchronism with the latter.

4. An optical transmitter apparatus according to claim 1, wherein said signal generator generates a random rectangular waveform signal in synchronism with said transmit signal.

5. An optical transmitter apparatus, comprising a light source for signal transmission, a Mach-Zehnder type intensity modulator, a transmit signal generator, a digital logic circuit and an intensity modulator driver circuit, wherein a transmit signal generated by said transmit generator is inputted to said digital logic circuit, two output signals of which are inputted to said intensity modulator driver circuit, and said Mach-Zehnder type intensity modulator modulates the light beam sent from said signal source in respect to intensity and phase to thereby output an optical signal for transmission, and wherein said two signals outputted from said digital logic circuit are combined such that said two output signals assume levels of "1" and "0" or levels of "0" and "1", respectively, when said transmit signal is "0" while said two output signals assume "1, 1" and "0, 0" in an alternating sequence or in a random sequence when said transmit signal is "1", said intensity modulator driver circuit outputs two levels of "V−" and "V+" in correspondence to the outputs "0" and "1", respectively, of said digital logic circuit, and said Mach-Zehnder type intensity modulator generates an optical signal output of substantially minimum intensity in response to the output combinations of (V+ and V−) and (V− and V+) of said intensity modulator driver circuit while generating an optical signal output having a substantially maximum intensity and a positive optical phase in response to an output combination of (V+ and V+) of said intensity modulator driver circuit, and an optical signal output having a substantially maximum intensity and a negative optical phase is generated by said Mach-Zehnder type intensity modulator in response to an output combination of (V− and V−) of said intensity modulator driver circuit.

6. An optical transmission system, comprising an optical transmitter apparatus, an optical fiber for optical signal transmission and an optical receiver apparatus, said optical transmitter apparatus including a light source for optical signal transmission, an intensity modulator, a phase modulator, a transmit signal generator incorporating a clock generator circuit and a data generator circuit, and an signal generator, wherein an output signal of said signal generator is supplied to said phase modulator and said clock generator circuit incorporated in said transmit signal generator, the output of said clock generator circuit being supplied to said data generator circuit whose output is supplied to said intensity modulator as the output of said transmit signal generator, and wherein a light beam emitted from said light source passes through said intensity modulator and said phase modulator to be modulated in intensity upon passing through said intensity modulator while modulated in phase upon passing through said phase modulator to be thereby spread in spectrum, the output optical signal of said phase modulator being sent out to said optical fiber as an optical signal to be transmitted, which signal is received by said optical receiver, wherein period of the clock signal of said clock generator circuit is adjusted in accordance with the output signal of said signal generator so that periodical timing at which said optical signal arrives at said optical receiver is substantially constant.

7. An optical transmitter apparatus, comprising a light source for optical signal transmission, an intensity modulator, a phase modulator and a transmit signal generator, wherein a transmit signal to be transmitted is generated by said transmit signal generator and inputted to said intensity modulator and said phase modulator, and wherein a light beam emitted from said light source passes through said intensity modulator and said phase modulator and undergoes intensity modulation and feeble phase modulation upon passing through said intensity modulator, the optical signal outputted from said intensity modulator undergoing such a phase modulation upon passing through said phase modulator that a phase shift due to said feeble phase modulation by said intensity modulator can be compensated, whereby an inverse chirping corresponding to a negative α-parameter is generated.

8. An optical transmission system, comprising an optical transmitter apparatus including a light source for optical signal transmission, an intensity modulator, a phase modulator and a transmit signal generator, an optical fiber and an optical receiver, wherein a signal to be transmitted is generated by said transmit signal generator and inputted to said intensity modulator and said phase modulator, and wherein a light beam emitted from said light source is sent out as an optical signal to be transmitted from said optical transmitter apparatus after having passed through said intensity modulator and said phase modulator, said optical signal being transmitted through said optical fiber to be inputted to said optical receiver, wherein intensity modulation of said optical signal is effected upon passing through said intensity modulator, while upon passing through said phase modulator, the optical signal undergoes such phase modulation that deterioration of waveform of said optical signal due to dispersion encountered during transmission through said optical fiber can be suppressed to a possible minimum by generating an inverse chirping corresponding to a negative α-parameter.

9. An optical transmitter apparatus, comprising a light source for optical signal transmission, an intensity modulator, a phase modulator, a transmit signal generator, an intensity modulator driver circuit and a phase modulator driver circuit, wherein a transmit signal to be transmitted is generated by said transmit signal generator and inputted to said intensity modulator driver circuit and said phase modulator driver circuit, output of said intensity modulator driver circuit being supplied to said intensity modulator while output of said phase modulator driver circuit being supplied to said phase modulator, and wherein a light beam emitted from said light source passes through said intensity modulator and said phase modulator and undergoes intensity modulation and feeble phase modulation upon passing through said intensity modulator, the optical signal outputted from said intensity modulator undergoing such a phase modulation upon passing through said phase modulator that a phase shift due to said feeble phase modulation by said intensity modulator can be compensated, whereby an inverse chirping corresponding to a negative α-parameter is generated.

10. An optical transmitter apparatus, comprising a light source for optical signal transmission, an intensity modulator, a phase modulator, a transmit signal generator, and a modulator driver circuit, wherein a transmit signal to be transmitted is generated by said transmit signal generator and inputted to said modulator driver circuit, outputs of positive and negative polarities generated by said modulator driver circuit being supplied to said intensity modulator and said phase modulator, respectively, and wherein a light beam emitted from said light source passes through said intensity modulator and said phase modulator and undergoes intensity modulation and feeble phase modulation upon passing through said intensity modulator, the optical signal outputted from said intensity modulator undergoing such a phase modulation upon passing through said phase modulator that a phase shift due to said feeble phase modulation by said intensity modulator can be compensated, whereby an optical signal which is not modulated in phase but modulated in intensity is sent out as an output optical signal of said optical transmitter apparatus.

11. An optical transmission system, comprising an optical transmitter apparatus which includes a light source for optical signal transmission, an intensity modulator, a phase modulator, an intensity modulator driver circuit, a phase modulator driver circuit and a transmit signal generator, an optical fiber and an optical receiver, wherein a signal to be transmitted is generated by said transmit signal generator and inputted to said intensity modulator driver circuit and said phase modulator driver circuit, output of said intensity modulator driver circuit being supplied to said intensity modulator while output of said phase modulator driver circuit is supplied to said phase modulator, and wherein a light beam emitted from said light source is sent out as an optical signal to be transmitted from said optical transmitter apparatus after having passed through said intensity modulator and said phase modulator, said optical signal being transmitted through said optical fiber to be inputted to said optical receiver, wherein intensity modulation of said optical signal is effected upon passing through said intensity modulator, while upon passing through said phase modulator, the optical signal undergoes such phase modulation that deterioration of waveform of said optical signal due to dispersion encountered during transmission through said optical fiber can be suppressed to a possible minimum by generating an inverse chirping corresponding to a negative α-parameter.

12. An optical transmission system, comprising an optical transmitter apparatus which includes a light source for optical signal transmission, an intensity modulator, a phase modulator and a modulator driver circuit and a transmit signal generator, an optical fiber and an optical receiver, wherein a signal to be transmitted is generated by said transmit signal generator and inputted to said modulator driver circuit, outputs of positive and negative polarities generated by said modulator driver circuit being supplied to said intensity modulator and said phase modulator, respectively, and wherein a light beam emitted from said light source is sent out as an optical signal to be transmitted from said optical transmitter apparatus after having passed through said intensity modulator and said phase modulator, said optical signal being transmitted through said optical fiber to be inputted to said optical receiver, wherein intensity modulation of said optical signal is effected upon passing through said intensity modulator, while upon passing through said phase modulator, the optical signal undergoes such phase modulation upon passing through said phase modulator that a phase shift due to said feeble phase modulation by said intensity modulator can be compensated, whereby said optical signal which is not modulated in phase but is modulated in intensity is provided as an output optical signal of said optical transmitter apparatus.

13. An optical transmitter apparatus, comprising a light source for optical signal transmission, an intensity modulator, at least first and second phase modulators, a transmit signal generator and a signal generator, wherein a transmit signal to be transmitted is generated by said transmit signal generator to be supplied to said intensity modulator and said first phase modulator, while a signal generated by said signal generator is supplied to said second phase modulator, and wherein a light beam emitted from said light source passes through said intensity modulator and said first and second phase modulators to undergo an intensity modulation and a feeble phase modulation upon passing through said intensity modulator and undergo such phase modulation upon passing through said first phase modulator that a phase shift due to said feeble modulation by said intensity modulator can be compensated, while being phase-modulated upon passing through said second phase modulator such that spectrum is spread, whereby an output optical signal of said second phase modulator is sent out as the optical signal for transmission.

14. An optical transmitter apparatus comprising:

an intensity modulator made of semiconductor material, intensity-modulating an optical signal with a phase modulation caused by a chirping characteristic thereof in accordance with a transmit signal; and a phase modulator made of semiconductor material, phase-modulating the intensity modulated optical signal with an opposite sign to the phase modulation caused by the chirping characteristic of the intensity modulator.

15. An optical transmitter apparatus according to claim 14, wherein the intensity modulator and the phase modulator have a semiconductor multi-quantum well structure.

16. An optical transmitter apparatus according to claim 14, wherein the intensity modulator and the phase modulator are formed in an integrated structure.

17. An optical transmitter apparatus according to claim 14, further comprising a bias circuit controlling a modulation characteristic of the intensity modulator.

18. An optical transmitter apparatus according to claim 14, further comprising a bias circuit controlling a modulation characteristic of the phase modulator.

* * * * *

UNITED STATES PATENT AND TRADEMARK OFFICE
CERTIFICATE OF CORRECTION

PATENT NO. : 5,515,196
DATED : 7 May 1996
INVENTOR(S) : Shigeki KITAJIMA et al.

It is certified that error appears in the above-indentified patent and that said Letters Patent is hereby corrected as shown below:

| Column | Line | |
|---|---|---|
| 3 | 36 | Change "illustrate" to --illustrating--. |
| 4 | 12 | Change "six" to --sixth--. |
| 4 | 14 | Change "phage" to --phase--. |
| 4 | 26 | Change "a" to --an--. |
| 7 | 50 | Change "degree" to --degrees--. |
| 10 | 47 | Change "modulate" to --modulation--. |
| 12 | 23 | Change "six" to --sixth--. |
| 12 | 56 | Change "serve" to --service--. |
| 14 | 64 | Change "remarkably be" to --be remarkably-- |
| 20 | 27 | Change "an signal" to --a signal--. |

Signed and Sealed this

Fifteenth Day of October, 1996

Attest:

BRUCE LEHMAN

*Attesting Officer*     *Commissioner of Patents and Trademarks*